United States Patent
Hars

(10) Patent No.: US 10,742,405 B2
(45) Date of Patent: Aug. 11, 2020

(54) METHOD AND SYSTEM FOR GENERATION OF CIPHER ROUND KEYS BY BIT-MIXERS

(71) Applicant: The Boeing Company, Chicago, IL (US)

(72) Inventor: Laszlo Hars, Lafayette, CO (US)

(73) Assignee: THE BOEING COMPANY, Chicago, IL (US)

(*) Notice: Subject to any disclaimer, the term of this patent is extended or adjusted under 35 U.S.C. 154(b) by 205 days.

(21) Appl. No.: 15/381,540

(22) Filed: Dec. 16, 2016

(65) Prior Publication Data

US 2018/0176011 A1    Jun. 21, 2018

(51) Int. Cl.
| | | |
|---|---|---|
| *H04L 9/08* | (2006.01) | |
| *H04L 9/06* | (2006.01) | |
| *G06F 9/30* | (2018.01) | |

(52) U.S. Cl.
CPC ........ *H04L 9/0861* (2013.01); *G06F 9/30029* (2013.01); *H04L 9/0618* (2013.01); *H04L 9/0625* (2013.01); *H04L 9/0631* (2013.01); *H04L 9/0643* (2013.01); *H04L 2209/24* (2013.01)

(58) Field of Classification Search
CPC ... H04L 9/0861; H04L 9/0618; H04L 9/0625; H04L 9/0631; H04L 9/0643; H04L 2209/24; G06F 9/30029
See application file for complete search history.

(56) References Cited

U.S. PATENT DOCUMENTS

| | | | |
|---|---|---|---|
| 6,192,129 B1 | 2/2001 | Coppersmith et al. | |
| 6,769,063 B1 * | 7/2004 | Kanda | H04L 9/002 380/29 |

(Continued)

FOREIGN PATENT DOCUMENTS

KR    101583285 B1    1/2016

OTHER PUBLICATIONS

Hars et al., "Pseudorandom Recursions: Small and Fast Pseudorandom Number Generators for Embedded Applications", EURASIP Journal on Embedded Systems, vol. 2007, 13 pages.

(Continued)

*Primary Examiner* — Eleni A Shiferaw
*Assistant Examiner* — Bassam A Noaman
(74) *Attorney, Agent, or Firm* — MH2 Technology Law Group LLP

(57) ABSTRACT

System and methods for generating round keys for a cryptographic operation are disclosed. The systems and method can use logic circuits that are operable to: obtain first inputs and second inputs; perform a bit-mixer operation on each of the first inputs and the second inputs; and generate round keys based on the performing the bit-mixer operation. The first inputs include a plurality of equal sized subkeys from a key material that is divided into a plurality of equal sized key material sub-blocks, a cipher key and the second inputs include a random input, one or more previous round keys, a round number. The cryptographic operation includes a cipher, a hash function, or a stream generator. The bit-mixer operation includes an exclusive-OR (XOR) tree, a substitution-permutation network, or a double-mix Feistel network, or a Rotate-Add-XOR (RAX) construction.

20 Claims, 11 Drawing Sheets

(56) References Cited

U.S. PATENT DOCUMENTS

| | | | | |
|---|---|---|---|---|
| 7,925,013 B1* | 4/2011 | Washington | ............ | G06F 21/72 |
| | | | | 380/239 |
| 2003/0198345 A1* | 10/2003 | Van Buer | .............. | H04L 9/0631 |
| | | | | 380/43 |
| 2004/0247116 A1* | 12/2004 | Boren | ................... | H04L 9/0662 |
| | | | | 380/37 |
| 2010/0008498 A1* | 1/2010 | Shirai | ..................... | H04L 9/002 |
| | | | | 380/44 |
| 2010/0098244 A1* | 4/2010 | Ciet | ........................ | H04L 9/002 |
| | | | | 380/29 |
| 2012/0328097 A1* | 12/2012 | Sheikh | .................. | H04L 9/0618 |
| | | | | 380/44 |
| 2016/0062919 A1 | 3/2016 | Hars | | |
| 2016/0062920 A1 | 3/2016 | Hars | | |
| 2016/0065368 A1 | 3/2016 | Hars | | |
| 2017/0373836 A1* | 12/2017 | Rarick | .................. | H04L 9/0631 |

OTHER PUBLICATIONS

Hars et al., "Pseudorandom recursions II", EURASIP Journal on Embedded Systems 2012, 11 pages.
Extended European Search Report dated Apr. 24, 2018 in corresponding European Patent Application No. 17195362.3.
Search Report and Written Opinion dated Jun. 16, 2020 in corresponding Singaporean Application No. 10201710088Q, 9 pages.

\* cited by examiner

METHOD AND SYSTEM FOR GENERATION OF CIPHER ROUND KEYS BY BIT-MIXERS

FIELD

The present disclosure relates generally to the protection of data in a computer system. In particular, to any of the three application areas of information assurance: protecting the secrecy of transferred messages, to the protection of secrecy of archived data, and to the protection of data stored in memory in a computer system, which data is often transferred on one or more buses therein.

BACKGROUND

To provide for secure communications and protection of financial, military, medical or other data requiring a high degree of protection, computer and microprocessor-based systems now implement various security measures. These measures are generally intended to preclude an adversary's illicit access to data transmitted on communication channels, stored in nonvolatile storage, such as disk drives or optical media, or stored in a memory being accessed by the microprocessor, for example, because the memory and microprocessor are on the same circuit board and/or coupled by a bus.

An exemplary application area is protecting the data stored in the memory of a secure computing system, but other types of applications are equally common and important. Common types of attacks on such processors can be categorized as active or passive attacks. In passive attacks an adversary reads the contents of the memory, in the hope to discover secrets, like passwords, copyrighted material, etc. A passive attacker can also monitor the data traffic between the processor and the memory (or some peripherals) for secrets.

Active attacks attempt to modify the contents of the memory, or the data traffic between the memory and the processor. Active attacks include attempts to copy-and-paste memory blocks between different locations, or playing back earlier content of the same, or another location. Such attacks can cause harm, for example by creating an infinite loop, or otherwise impact the program running on the secure microprocessor, and using data from the protected memory. In a known data recognition attack, an adversary may attempt to learn an encryption key by watching writes of known data to the same address.

The secrecy and integrity of stored, processed or transmitted sensitive data can be assured by cryptographic means. The most important cryptographic tools are block ciphers. They use secret keys, which determine their behaviors at a given encryption algorithm. The most often used ciphers perform many iterations of transformation steps, called rounds. These transformation steps are influenced by secret round-keys, derived from the cipher key. The security and speed of the cipher depends on how these round keys are generated. Many currently used ciphers are slow and consume a lot of power and energy, partly because of the complexity of generating highly uncorrelated round keys. Their key generation also leaks exploitable information on side channels. Other currently used ciphers employ round-key generators, which produce low quality (correlated, biased) keys.

The round keys for block ciphers have to be highly uncorrelated, even though they are derived from the same cipher key. The algorithm generating the round keys is also called key-schedule. Many ciphers use simple key-schedules, like LFSR's (Linear Feedback Shift Registers). These are easily computed and fast, but the resulting round-keys are highly correlated. For example, in the LFSR case, half of the time a round key is just a 1-bit rotated version of the previous round-key, and at the other half of the time only a handful bits are changed in the rotated previous round-key.

If the key schedule is not complex enough to produce uncorrelated round-keys, the cipher needs many rounds to achieve high security. Commonly used ciphers accomplish their key-schedules by repeating simple steps, including rotate, XOR, and bit rearrangements. They face a difficult tradeoff: few such steps produce correlated round-keys, and thus the cipher needs many rounds; while performing many key-schedule steps consumes much time at each round. Either way the cipher needs a considerable amount of time.

Currently used key schedule algorithms generate round-keys from earlier round-keys, therefore they have to generate all the round-keys to get the last one, with which the decryption can begin. At single cipher operations on general purpose microprocessors the overall number of operations could be the same with any order of round-key generation, so this iterative key schedule does not slow down the ciphers implemented in software. On the other hand, at systems implemented in electronic hardware the sequential round-key generation causes an initial delay at decryption. An exception is when many decryption operations are performed with the same key, and the corresponding round-keys can be cached. However, large cache memories are targets of physical attacks, and using the same key over and over again exposes the security system to side channel attacks. Key-rolling improves the security of most applications, but it prevents caching the round-keys, and can result in a slowdown in decryption. (Key rolling means changing the encryption key after every one, or after every few uses.)

Thus, a heretofore unaddressed need exists in the industry to address the aforementioned deficiencies and inadequacies.

SUMMARY

According to examples of the present teachings, a method for generating one or more round keys for a cryptographic operation is provided. The method comprises obtaining one or more first inputs and one or more second inputs; performing, by at least one electronic circuit, a bit-mixer operation on each of the one or more first inputs and the one or more second inputs; and generating, by at least one electronic circuit, one or more round keys based on the performing the bit-mixer operation.

In some examples, the one or more first inputs comprise a plurality of equal sized subkeys from a key material that is divided into a plurality of equal sized key material sub-blocks or a cipher key. The one or more second inputs comprise a randomly generated fixed input, one or more previous round keys, or a round number. In some examples, the method further comprising generating the one or more first inputs from a shorter key by applying a cryptographic operation, a bit-mixer with hard coded key material, a counter input, or combinations thereof. The cryptographic operation comprises a cipher, a hash function, or a stream generator. In some examples, the key material is secret, shared between communicating parties. In some examples, the key material is hardcoded. In some examples, the key material is randomly generated.

In some examples, the cipher key is combined with hardcoded key material by exclusive-OR (XOR) operation on portions of the cipher key with portions of the key material. In some examples, the bit-mixer operation comprises an exclusive-OR (XOR) tree, a substitution-permutation network, or a double-mix Feistel network, or a Rotate-Add-XOR (RAX) construction. In some examples, the XOR tree comprises a plurality of negated-AND (NAND) gates or a plurality of multiplexers. As used herein, NAND refers to a NOT-AND, or Negative-AND logical operation. In some examples, the generating further comprising performing a scrambling operation on an output of the performing. In some examples, the method further comprises producing a block of data with the one or more round keys. In some examples, the method further comprises repeating the performing and the generating the one or more round keys for a cryptographic cipher. In some examples, the method further comprises selecting the bit-mixer, wherein the bit-mixer operation has the properties comprising every input bit affects every output bit, changes in the input bit cause, on average, half of output bits to change; changes in the input bits yield output values without correlation to the input bits or to a change pattern of the input, keys are employed to make their behavior unpredictable to an observer not knowing the keys, and fixed lengths of the input bits and output values can be independently and arbitrarily chosen. In some examples, the XOR tree further comprises performing a negative-AND (NAND) logical operation on each first input of the one or more first inputs with each second input of the one or more second inputs to select which of the plurality of first inputs to input into an XOR logical operation, wherein an output of the XOR tree produces output with respect to the plurality of first inputs that are used as inputs.

In some examples, the method further comprises performing a scramble operation to the output of the XOR tree to make the bit-mixer function nonlinear.

In some examples, the substitution-permutation network further comprises performing a non-linear substitution operation on each of the plurality of first inputs; performing a permutation operation on each output of the substitution operation; performing a XOR operation on each output of the permutation operation with the one or the first inputs or one of the second inputs.

In some examples, wherein, in the double-mix Feistel network, each of the one or more first inputs are divided into an initial left half and initial right half, the method further comprises: calculating an updated left half and an updated right half for each round of a plurality of rounds, wherein the calculating the updated left half comprises applying a first function to an input left half to produce a first result, and mixing the first result with an input right half, wherein calculating the updated right half comprises applying a second function to the input left half to produce a second result, and mixing the second result with a round key, and wherein the input left half and input right half are the initial left half and initial right half for a first of the plurality of rounds, and the updated left half and updated right half for an immediately preceding round for each round thereafter.

According to examples of the present disclosure, a system for generating one or more round keys for a cryptographic operation is provided. The system comprises one or more logic circuits operable to: obtain one or more first inputs and one or more second inputs; perform, by at least one electronic circuit, a bit-mixer operation on each of the one or more first inputs and the one or more second inputs; and generate, by at least one electronic circuit, one or more round keys based on the performing the bit-mixer operation. In some examples, the one or more first inputs comprise a plurality of equal sized subkeys from a key material that is divided into a plurality of equal sized key material sub-blocks, a cipher key and the one or more second inputs comprise a random input, one or more previous round keys, a round number. In some examples, the cryptographic operation comprises a cipher, a hash function, or a stream generator. In some examples, the bit-mixer operation comprises an exclusive-OR (XOR) tree, a substitution-permutation network, or a double-mix Feistel network, or a Rotate-Add-XOR (RAX) construction.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate the present disclosure and together with the description, serve to explain the principles of the present disclosure.

DETAILED DESCRIPTION

Figure 1:
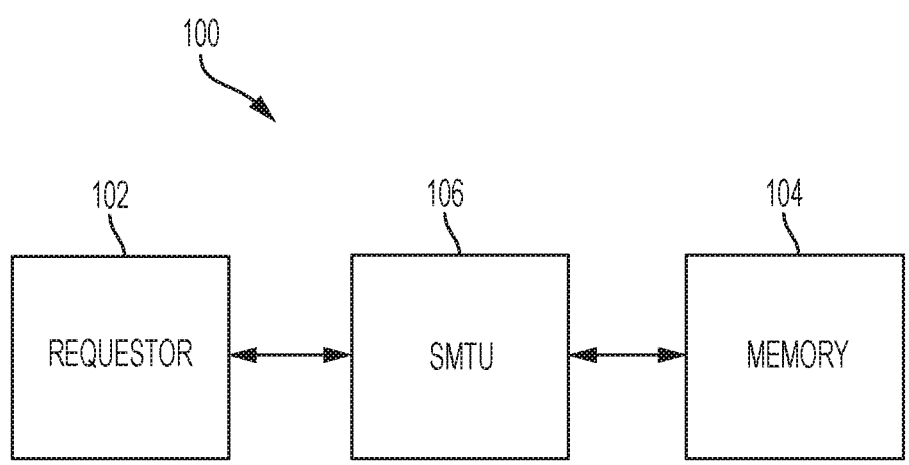
FIG. 1 is an illustration of a system in accordance with example implementations of the present disclosure.

Reference will now be made in detail to exemplary implementations of the present disclosure, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary implementations in which the present disclosure may be practiced. These implementations are described in sufficient detail to enable those skilled in the art to practice the present disclosure and it is to be understood that other implementations may be utilized and that changes may be made without departing from the scope of the present disclosure. The following description is, therefore, merely exemplary.

In many information security applications, high-performance, fix-sized input and output functions which thoroughly mix their input value are desired. These functions, which are called bit-mixers, produce output values with no statistical correlation to their input, e.g. any simple change in the input causes on average half of the output bits to change. Further, bit-mixers utilize keys to alter their behavior. When the keys are secret, the behavior of the bit-mixers is unpredictable to an observer.

While performance and power consumption are considerations in embedded applications, advanced very-large-scale integration (VLSI) technologies provide designers some ability to trade circuit size for improved security. While other uses are possible, applications in which one or both the input and output interfaces are internal to the design and thus hidden from the observer are discussed below. In these instances, the cryptographic requirements beyond a generalized strict avalanche criterion are minimized if not eliminated. Specifically, the primary remaining attack surface becomes data-dependent information exposed through the circuit's side channel emanations, including variations in response time, electromagnetic radiation, and fluctuations in power consumption.

Block ciphers, using secret keys, encrypt data blocks, called plaintext to ciphertext blocks, by performing iterations of transformation steps, called rounds. Round keys, derived from the cipher key, influence the transformations. The security and speed of the cipher depend on how these round keys are generated.

As described below, methods and systems for generating uncorrelated round keys by employing bit-mixers, nonlinear complex functions, influenced by large key materials are provided. When implemented in electronics, these round-key generators are faster than current algorithms, have little or no exploitable side channel leakage, improving the security. These result in faster and more secure new ciphers, with reduced power consumption.

The disclosed methods improve the quality of the generated round-keys for block ciphers, by employing highly nonlinear, very complex algorithms, bit-mixers, which are best implemented in electronic hardware. They improve the generation speed, power use, and the security of the ciphers. Using them in embedded systems (employed in e.g. board computers of aircrafts) is of low cost. They don't significantly increase the circuit size, but reduce the overall power usage. Deployed systems can use slower electronic components, further reducing costs, and the energy and power consumption of the computing system. The operational speed and security is also improved. Affected systems include security subsystems of flight computers, military and space programs, corporate networks, personal and laptop computers, smart mobile devices, even secure communication networks. The manufacturers of high performance computers, secure microprocessors, security electronics or security software always want to improve the quality, the speed, the security and the power use of their products. The disclosed methods and systems improve the power use, the performance and the security of computing systems: in-flight computers, military and space programs, corporate networks, personal and laptop computers, smart mobile devices, even secure communication networks.

In accordance with examples of the present disclosure, the round-keys (key schedule) are internal, "within" any iterative secure cipher (which is modified by them) and are derived from the main key for an unaltered cipher. Part of the input of the bit mixer is secret (the original key or the previous round key(s)), but the input can also contain public information, like the current round number. Bit-mixers use additional key materials, which can be secret, or public, like in the conventional key generators. Public key material can also be hard-coded or otherwise fixed like in conventional key generators. By using the disclosed methods and systems, bit-mixer based algorithms used for round key generation can be used inside any iterative cipher, which can provide faster operation (in parallel electronic hardware), lower power and energy requirements, moderate circuit size, improved security by eliminating statistical correlations between round keys, and improved security by reducing side channel leakage of electronic hardware implementations. The key material used by the bit-mixers is divided into chucks of equal size, called "subkeys." Bit-mixers produce highly uncorrelated round-keys, of arbitrary length, which makes the key-schedule algorithms scalable, that is, applicable for ciphers of any block sizes.

The input of a bit-mixer used in round-key generation includes the secret key of the cipher, and may include at least one of the round counter and earlier round-keys. This round counter is short (4 . . . 7 bits), because no practical ciphers use more than 128 rounds. The counter can be expanded to the same length as the key, by shuffling and repeating its bits, some of them possibly inverted. By way of one example, the key-schedule algorithm can use an expanded counter as an input of the bit-mixer, and the cipher key is (part of) the key material of the bit-mixer. The simplest case is when the cipher key is the first subkey of the bit-mixer. The other subkeys can be (a) kept constant or (b) derived from the cipher key by a simple algorithm. Another example includes the secret key of the cipher as the input of the bit-mixer and the expanded counter is the first subkey of the bit mixer. The other subkeys are (a) kept constant or (b) derived from the cipher key by a simple algorithm. Still another example of the key-schedule algorithm includes the expanded counter and the cipher key being bitwise XORed to provide the input of the bit-mixer. Alternative variants and combination of the above examples can be used with similar security and speed benefits. When the expanded counter and the cipher key are XOR-ed (third example above), there is no need to invert any of the counter bits in the expansion process: the XOR with the 1-bits of the cipher key actually inverts the corresponding counter bits.

Bit-mixers use a large amount of key material. When stored in digital memory or registers, this key material allows the personalization of the cipher (dependent of this key material, different ciphers are defined). The other alternative is hardcoding the subkeys of the bit-mixers. It makes the key schedule faster, but the resulting ciphers are also fixed, they cannot be personalized. This is the most common case in practice: when encrypted data is sent to, or received from unknown entities, the ciphers cannot be personalized.

Any of the disclosed key schedule mechanisms can be directly replace the key-schedule of any existing block cipher. As a result, a number of new ciphers can be defined, which are faster and more secure in hardware implementations than their original versions. Some of the ciphers that can be improved using the disclosed key schedules include, but are not limited to, Twofish, Serpent, AES (Rijndael), Blowfish, CAST5, RC4, 3DES, Skipjack, Safer+/++, IDEA, SIMON, SPECK, Present, PRINT, etc.

One may generally think of bit-mixing as performed by reduced round ciphers with arbitrary block sizes where the input can be padded or the output folded together via XOR functions or k-to-1 S-Boxes (as required to provide expansion or compression). While there are indeed other constructions, the properties of the bit-mixers in accordance with examples of the present disclosure include: every input bit affects every output bit; simple changes in the input cause on average half of the output bits to change; simple changes in the input yield output values without apparent correlation to the input or to the change pattern of the input, i.e. standard statistical tests accept the corresponding output sequence as random; keys are employed to make their behavior unpredictable to an observer without access to the keys; and the fixed lengths of the input and output values can be independently and arbitrarily chosen. The term "simple change" can be one in which less than half of the bits change simultaneously or even one which results from a software-based transformation using fewer than a dozen instructions. It is instructive to note that the second property above is a generalization of the Strict Avalanche Criterion. For iterative bit-mixers, the number of rounds can be determined, which is required to generate output values satisfying the Strict Avalanche Criterion, i.e. are indistinguishable from random, after changing single input bits.

Referring now to FIG. 1, a system 100 is illustrated according to example implementations of the present disclosure. The system may include one or more of each of a number of components, units or the like (generally "components") at least some of which may be composed of logic circuits such as multiplexers, registers, arithmetic logic units, memory, microprocessors and the like. The system may be designed for any of a number of different applications, and may have particular applicability in systems including or coupled to memory susceptible to attacks, such as in-flight computers, military and space programs, corporate network, personal and laptop computers, smart mobile devices. As shown, for example, the system may include one or more components referred to herein as requestors 102 operable to (e.g. configured to) initiate or otherwise request read and/or write transactions (at times referred to as operations) with one or more memories 104, which in some examples may occur on one or more buses between them.

In accordance with example implementations, the system 100 may further include one or more components referred to herein as secure memory transaction units (SMTUs) 106 configured or operable to encrypt and decrypt data transfers between a requestor 102 and memory 104, and may be used in at least some if not all read or write transactions with the memory. And as described below, in some but perhaps not all examples, the SMTUs may also be configured or operable to authenticate the contents of the memory. In various examples, the SMTU design may be memory agnostic in that the type and location of the memory (internal or external) may be "unknown" to the SMTU.

In some examples, the SMTU 106 may provide, with very high probability, a different encryption for every location in the memory 104. The SMTU may use a parallelizable cipher construction for encryption and/or authentication of the contents of the memory. In some examples in which the SMTU uses the parallelizable cipher construction for one but not the other of the encryption and authentication, the SMTU may use any of a number of other ciphers for the other, such as a combination of standard operation modes of the Advanced Encryption Standard (AES) cipher, as modified by using the bit-mixer round key generation as provided herein. Each amount (e.g., 16 bytes) of plaintext data (sometimes simply referred to as plaintext or data) to be stored at a respective memory location at least within a window of memory locations may be encrypted with a unique encryption and tagged with a data version value and data authentication tag, which may be stored at the memory location with the encrypted data (at times referred to as ciphertext).

In some examples, the data version value may be derived from a global write counter (GWC) (e.g., 48-bit value) that indicates the number of encrypted write operations that have taken place such as in a current computing session. In other examples, the data version value may be derived using the number of write operations over multiple computing sessions, a time stamp or the like. Or in yet other examples, the data version value may be derived from a clock.

In some examples, the GWC may be reset at the beginning of every session of secure operation. The GWC values may be stored in-the-clear or encrypted with the user data, and modified by a secret mask value before use as part of the key generation or diversifying the encryption or data authentication in other ways. The GWC value may be incremented before any write operation by an increment value, which may be sized similar to the GWC (e.g. 48-bit value). This increment value may be a large odd value that does not have many consecutive Vs or 0's in its binary representation. Examples of suitable increment values are segments of the bit sequences of pi, e, sqrt(2), sqrt(3), the golden ratio, etc. Use of values such as these may assure that consecutive GWC values differ in about half the bits, in the average. Use of an odd GWC increment value may assure that the GWC will not wrap around in typical applications for more than ten years of continuous operation.

The data authentication tag at a memory location may depend on the ciphertext at that memory location, and in a manner that is cryptographically secure in that an adversary cannot create a valid data authentication tag, nor may the adversary be able to deduce any information about the ciphertext from the data authentication tag. In some examples, the data authentication tag may serve as a message authentication code, a short piece of information used to authenticate the ciphertext, and to detect data tampering and forgery. The tag may protect both the ciphertext's integrity as well as its authenticity, by allowing detection of any changes to it. In some examples, the tag may be implemented by a block cipher, that is, an algorithm that operates on the ciphertext to perform a transformation specified by a key.

The ciphertext and data authentication tag at a memory location may be produced with keys based on at least the data version value and address of the memory location. The data version value may be updated with each write operation at a memory location, and the key with which the ciphertext is produced may thereby change with each write operation, as well as from memory location to memory location. The data authentication tag may be produced with a second key different from the key that produced the block of ciphertext; but like that key, the second key may change with each write operation and from memory location to memory location. In some examples, a secret random number and other values, such as a security mode value, may be incorporated to further diversify the encryption and authentication. As described herein, the term random may be used broadly to refer to either random or pseudorandom (e.g., number iteratively generated by a deterministic algorithm, starting from a true random seed).

During read transactions in which the requestor 102 has requested data from the memory, the SMTU may read previously-encrypted data (ciphertext) from the memory. The encrypted data may be decrypted and authenticated by the SMTU against signs of tampering; and the SMTU may return the decrypted data (plaintext) to the requestor in instances in which the data is considered valid. In write transactions, the SMTU may read the data at a target location, then decrypt and authenticate that data just as with a read access. Once this is complete, the SMTU may cause the data to be written to be merged with the data read from the location, encrypted, and then written back to the memory. As used here, merged means to replace the portion of the data read back that has changed. If desired, a different approach can be used when a complete block of ciphertext is to be written. In these instances, the merge operation may become a replacement, and the initial read operation may be omitted, trading security for speed.

In various examples, a method for providing security for read data being transferred between, or within, units in the system 100 may include dividing the memory 104 into a series of addressable locations (the memory thereby being an addressable memory), each having an address and each storing encrypted data, a data version value (sometimes referred to as version information, or simply as a version value) and a data authentication tag. As described herein, an addressable location of the memory may at times be varyingly but equally referred to as an address, a location or an addressable location. A unique encryption key for the encrypted data, and a different, unique authentication key for the data authentication tag, may be used for each address. These keys may be unpredictable to an adversary, and kept secret before, during and after they are used.

In each read operation, the data version value, data authentication tag and a block of ciphertext may be read at a memory location having a respective address. The respective keys with which the ciphertext and data authentication tag were produced may be regenerated using the data version value and respective address. The ciphertext may be decrypted with its key to produce its corresponding plaintext. And using the second key for the data authentication tag, the ciphertext may be compared with the data authentication tag to verify its integrity and authenticity.

In each write operation, new plaintext data may be written to a memory location in memory 104. In some examples, each write operation may be preceded by a data read at the location and verification of the data by the SMTU 106 as valid. The process of writing data to the memory location may include the SMTU updating the data version value such as to reflect a new number of memory write operations made. The SMTU may then use another encryption of the new data using the updated data version value and respective address of the memory location (and perhaps a random number and/or some other values), and the SMTU may generate a new data authentication tag that depends on the encrypted new data.

In a further aspect of example implementations of the present disclosure, the SMTU 106 may be configured or operable to implement a parallelizable cipher construction. This cipher may be non-invertible block cipher and include a plurality of parallel, different mixing functions and a combination function. As explained in greater detail below, these mixing functions may include the same or different combinations of different types of functions, such as Feistel networks, double-mix Feistel networks (DMFNs), substitution-permutation networks, binary trees of bitwise exclusive-or (XOR) operations—trees at times referred to simply as XOR trees, some standard cipher operated a reduced number of rounds, and the like. The cipher of example implementations may be used for encryption or authentication, and may be implemented in one or more logic circuits in at most one clock cycle of the respective circuit(s). When non-invertible bit-mixers are used as ciphers, no decryption may be possible in certain encryption modes such as electronic codebook (ECB) or cipher-block chaining (CBC), although stream cipher modes are possible.

According to this further aspect of example implementations, the SMTU 106 may be configured or operable to receive an n-bit input block of data, and produce by the cipher, an m-bit output block of data from the input block of data. The block size n may be arbitrary, and in various examples n may be 64, 128 or 256 bits; and m and n may be equal or unequal in number. Production of the output block of data may include the SMTU being configured or operable to apply the plurality of parallel, different mixing functions to the input block of data to produce a plurality of updated blocks of data, with each mixing function being configured or operable to map the input block of data to a respective one of the plurality of updated blocks of data. The SMTU may then combine the plurality of updated blocks of data in the combination function to produce the output block of data.

In some examples, the mixing functions may be invertible. As indicated above, the mixing functions may be different, and may be of any one or more of a number of different types of mixing functions. For example, at least some of the mixing functions may be implemented by respective Feistel networks including respective, different round functions. Additionally or alternatively, for example, at least some of the mixing functions may be implemented by respective DMFNs including respective, different first or second round functions. Additionally or alternatively, for example, at least some of the mixing functions may be implemented by respective substitution-permutation networks including respective, different substitution layers or transformation layers. Further additionally or alternatively, for example, at least some of the mixing functions may be implemented by respective XOR trees, in which a plurality of sub-keys may be produced from the input block of data and mixed using the respective binary trees.

In some examples, in the combination function, each bit of the output block of data may depend from one or more bits of the input block of data, and every bit of the block of data may influence one or more bits of the output block of data. In a more particular example, the combination function may be implemented by a bitwise XOR operation or another appropriate, perhaps more complex operation.

In some examples, m in the m-bit output block of data may be the same in number as n in the n-bit input block of data for the bit-mixer function. In other examples, m may be different than n. This bit-mixer function can be constructed from such bit-mixer functions, which has equal length input and output, called block length. For example, if m>n, the block size of the bit mixer can be m, the updated blocks of data (the output of the bit-mixer) may be partitioned into pieces, which may then be combined to produce the output block of data. In another example, if m<n, the block size of the bit-mixer can be n. In this case the lengths of the input blocks of data may be increased to n by repeating certain bits one or more of which may be inverted, and dispersing these repeated bits among the respective input blocks of data, perhaps differently for each mixing function. The bit-mixer may then operate on these extended-length input blocks of data.

In some examples in which the cipher is used for authentication, the output block of data may be a data authentication tag, and SMTU 106 may be configured or operable to produce the data authentication tag that depends on a respective address of a memory location in the memory 104. In one example in which m=208 and n=80, the input block of data to the cipher may be a 128-bit ciphertext concatenated with a 32-bit address and 48-bit data version value, and the data authentication tag may be formed from the resulting 80 bits. The SMTU may then be further configured or operable to perform a write operation to write a block of ciphertext and the data authentication tag at the memory location having the respective address. In these examples, the protected memory may include a plurality of windows of memory locations containing records of data, each of which stores encrypted blocks of plaintext with a respective data authentication tag that changes from memory location to memory location.

In some examples in which the cipher is used for encryption, the output block of data may be a multi-bit pad value, and the SMTU 106 may be configured or operable to produce the pad value based on a respective address of a memory location in the memory 104. In one example in which n=m=128, the pad may be computed from an input block of data composed of a 32-bit address, concatenated with 48-bit data version value and configuration data. The SMTU may then combine the pad value with a block of plaintext by an XOR operation to produce a block of ciphertext. Similar to the previous example, the SMTU may be further configured or operable to perform a write operation to write the block of ciphertext at the memory location having the respective address. And the memory may include a window of memory locations each of which stores a plurality of respective block of ciphertext that changes from memory location to memory location.

Figure 2:
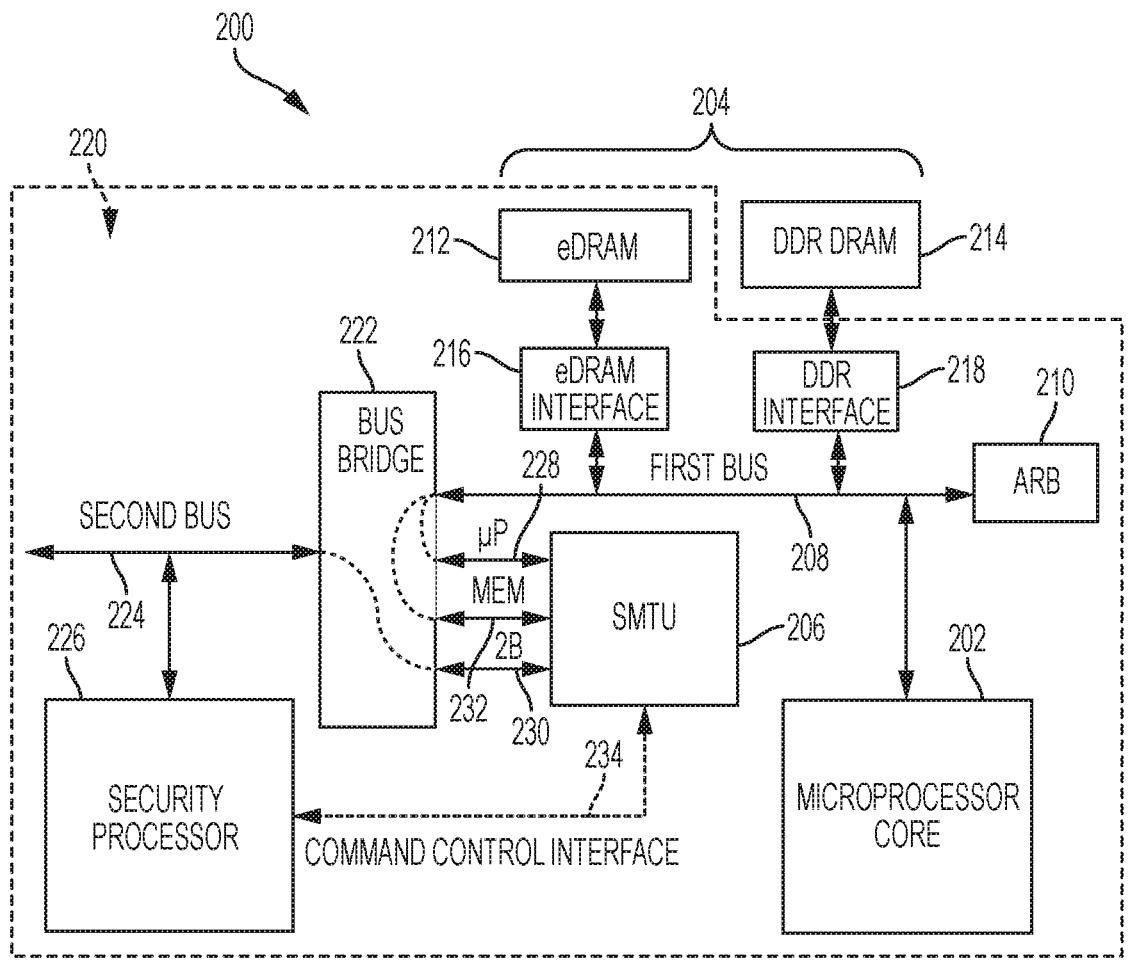
FIG. 2 is an illustration of a system that in some examples may correspond to the system of FIG. 1.

FIG. 2 illustrates one example of a system 200 that in some examples may correspond to the system 100 of FIG. 1. The system may be constructed in accordance with any of a number of different approaches. In some examples, the system may be constructed according to a system-on-chip (SoC) approach in which the components of a system are integrated into a single integrated circuit (IC) (sometimes referred to as a "chip"). In a more particular example, the system may be constructed according to the CoreConnect microprocessor bus-architecture from IBM Corporation. As described herein, various components of the system or functions of components of the system may be described in the nomenclature of a particular technology such as SoC or even CoreConnect. It should be understood that any specific nomenclature used herein is merely for purposes of illustration, and should not be taken to limit the scope of example implementations of the present disclosure.

Similar to the system 100 of FIG. 1, the system 200 of FIG. 2 may include a number of components at least some of which may be composed of logic circuits. As shown, for example, the system may include a microprocessor core 202, memory 204 and SMTU 206, which in some examples may function as or correspond to the requestor 102, memory 104 and SMTU 106 of FIG. 1. Although not shown, it should be understood that the system may include other components that may at times be configured or operable to function as a requestor, which again may be a component configured or operable to initiate or otherwise request read and/or write transactions with memory.

As shown in FIG. 2, the microprocessor core 202 may be directly or indirectly coupled to a first bus 208 along with the memory 204, SMTU 206 and other components, and use of the first bus may be allocated by an arbitration circuit 210. In one example, the microprocessor core may be a PowerPC core commercially available from IBM Corporation, and the first bus may be a processor local bus (PLB). Examples of suitable memory include embedded dynamic access memory (eDRAM) 212, double data rate synchronous (or other) dynamic random access memory (DDR DRAM) 214 or the like, some of which may be coupled to the first bus by respective memory controls or interfaces 216, 218. In some examples in which the system is constructed as a SoC with various components integrated into a single integrated circuit 220, the memory may be off-chip (external) from other components of the system, and may be coupled to the first bus by an on-chip (internal) memory control. This is illustrated, for example, by the DDR DRAM in FIG. 2.

The components coupled to the first bus 208 may also include a bus bridge 222 between the first bus and another, second bus 224 such as a transaction bus to which additional components may be coupled, such as a security processor 226 and perhaps components that may at times function as requestors. In some examples, the first bus may be a high-speed bus with high-performance components coupled thereto, and the second bus may be a low-speed bus. In these examples, the bus bridge may serve to separate the high-performance components from the low-performance components, which may in turn improve system performance.

The SMTU 206 may be configured or operable to encrypt and decrypt data transfers between requestors such as the microprocessor core 202 and either or both of the eDRAM 212 or DDR DRAM 214. The SMTU may act as a slave unit serving read and write requests initiated by the microprocessor core or another requestor, where the SMTU may initiate the read or write as requested from a particular memory address. The SMTU may thereby provide a high level of security for these transactions.

The SMTU 206 may be coupled in the system 200 in any of a number of different manners. As shown, for example, the SMTU may be coupled to the bus bridge 222 by three bidirectional external data interfaces, and may be coupled to the security processor 226 by another bidirectional external data interface. That is, the SMTU may be coupled to the bus bridge by a microprocessor-core interface 228, a second-bus interface 230 and a memory interface 232, and coupled to the security processor by a command-and-control interface 234.

The microprocessor-core interface 228 may be coupled to the microprocessor core 202 via the first bus 208 to receive control information such as requests to read data from and/or write data to memory 204. The second-bus interface 230 may be coupled to the second bus 224, and the memory interface 232 may be coupled to the memory via the first bus. The bus bridge 222 may allow transactions over the microprocessor-core interface and memory interface be routed only to and from the first bus, and the transactions over the second-bus interface to be routed only to and from the second bus. The command-and-control interface 234, then, may enable the security processor 226 to provide command and control information to the SMTU through a separate interface.

Figure 3:
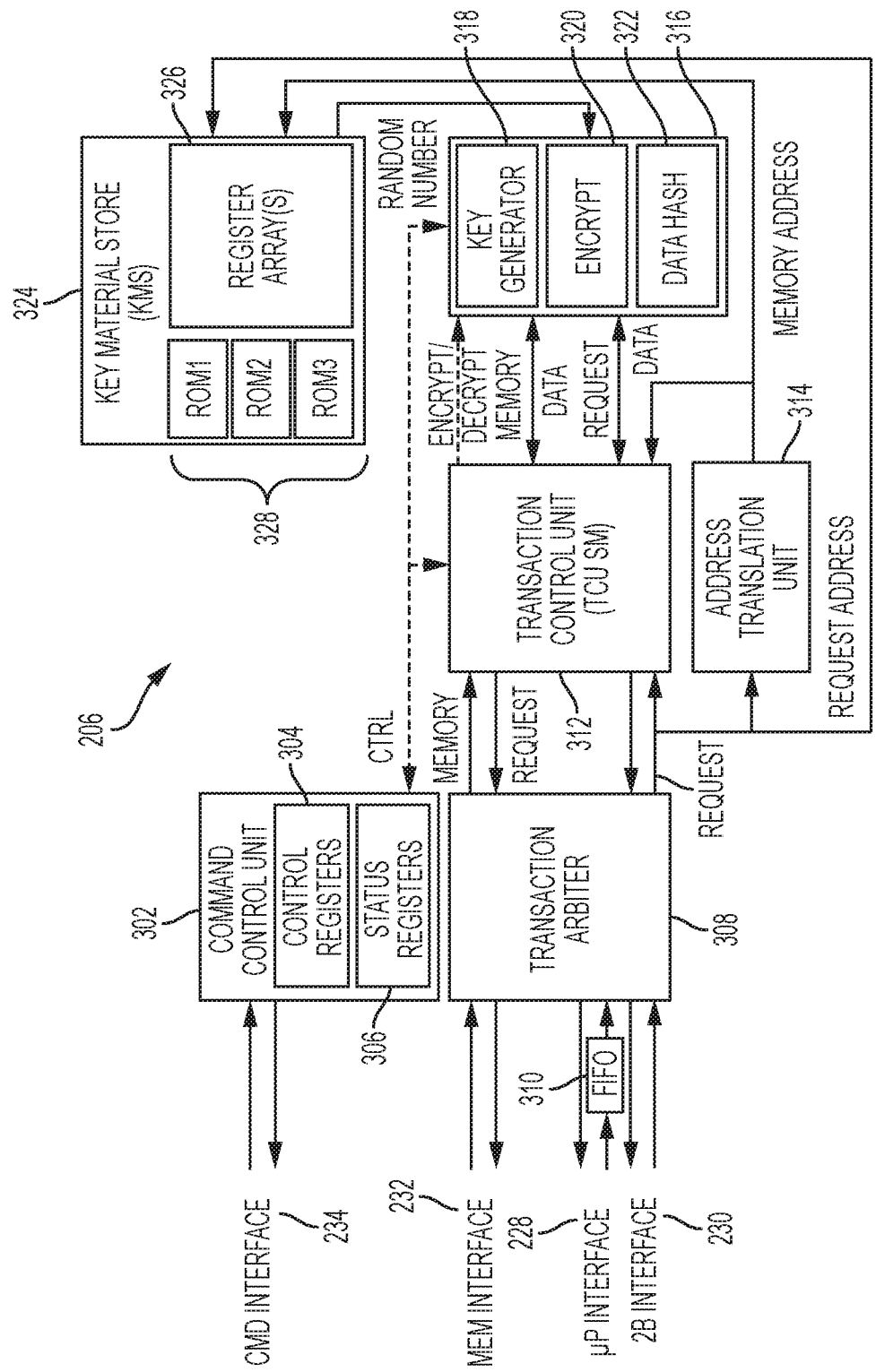
FIG. 3 is an illustration of a secure memory transaction unit, in accordance with example implementations.

FIG. 3 is a diagram illustrating various components of the SMTU 206 of FIG. 2, at least some of which, again, may be composed of logic circuits. As shown, the SMTU may include, and the command-and-control interface 234 may be coupled to, a command control unit 302 having control registers 304 and status registers 306. The SMTU may include a transaction arbiter 308 coupled to and configured or operable to allocate use of the microprocessor-core interface 228, second-bus interface 230 and memory interface 232. A first-in first-out (FIFO) memory 310 on the microprocessor-core interface may be configured or operable to buffer transactions to the arbiter.

The arbiter 308 may also be coupled to a transaction control unit 312 and an address translation unit 314, and the transaction control unit may be in turn coupled to a cryptography unit 316 that provides a key generator 318, encryption unit 320 and data-hashing unit 322. The cryptography unit may be coupled to a key material store (KMS) 324 configured or operable to provide random numbers to the key generator to generate keys for the encryption unit and data-hashing unit. The encryption unit may be configured or operable to encrypt and decrypt data for all read and write operations with an appropriate memory 204 in response to read or write requests invoking the SMTU 206. And the data-hashing unit may be configured or operable to produce data authentication tags for encrypted data (ciphertext) read from and written to the memory. In some examples, either or both of the encryption unit or data-hashing unit may employ a parallelizable cipher construction such as that described herein. And in some examples in which only one but not the other uses the parallelizable cipher construction, the other may use any of a number of other constructs. For example, the encryption unit may be configured or operable to employ an AES cipher for encryption and decryption operations, or the data-hashing unit may be configured or operable to employ a keyed hash function, as modified by using the bit-mixer round key generation as provided herein.

In some examples, the KMS 324 may include one or more register arrays 326 (sometimes referred to as KMS memories) configured or operable to provide random numbers. Because the SMTU relies on random numbers provided by the KMS, the use of high quality random numbers is often desirable. In some examples, then, the KMS may include four 64×64 register arrays that provide 16K-bit random numbers. Prior to operation, the KMS unit may be initialized with 16K-bit random numbers, which in some examples may be generated outside of the SMTU.

As an alternative to using a true random number, in some examples, the KMS 324 may be initialized from one or more onboard configuration/entropy read-only memory blocks (ROMs) 328 such as 512×16 ROMs, three of which are shown as ROM1, ROM2 and ROM3. These ROMs may contain random numbers generated during system design. Using the configuration ROMs as the source of the random numbers may make the generated keys less random, therefore degrading the strength of the anti-tampering mechanism. However, there are applications in which using the ROMs as the random number sources may be desirable. One application is of a time critical application, in which long initialization delays that are associated with generation of the random number are not acceptable. Another type is an application that needs to generate an encrypted data image that can be restored following a system reset or an image that can be restored on a different system.

Further information regarding various features of the system 200 and SMTU 206 according to example implementations may be found below and in the aforementioned, related and incorporated '871 application.

Figure 4:
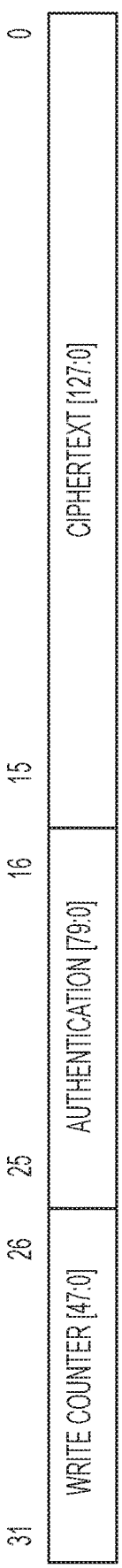
FIG. 4 illustrates the data structure of information stored in a memory location, in accordance with example implementations.

FIG. 4 illustrates the data structure for an encrypted record stored in memory 104, 204, according to some example implementations of the present disclosure. As shown, encrypted data may be stored using 32-byte blocks each of which may include 16 bytes of encrypted payload (ciphertext), and 16 bytes of security data. The security data may include 6 bytes of a data version value (in the illustrated example, a write counter value), and 10 bytes of authentication tag. The 6-byte write counter is a field that may be incremented every time a memory location is written, regardless of the address. As a result, the incremented value is unique to each address. The encryption operation and the authentication key for a memory location may be derived from its address, and write counter value, and from a random number. In other examples, more or fewer fields may be used in the encryption. Because every 16 bytes of encrypted data require an additional 16 bytes for an authentication tag and write counter value, the effective data storage capacity of each window of memory locations may be one-half its physical size. But again, in other examples, larger or smaller memories and different data and tag sizes may be implemented.

Figure 5:
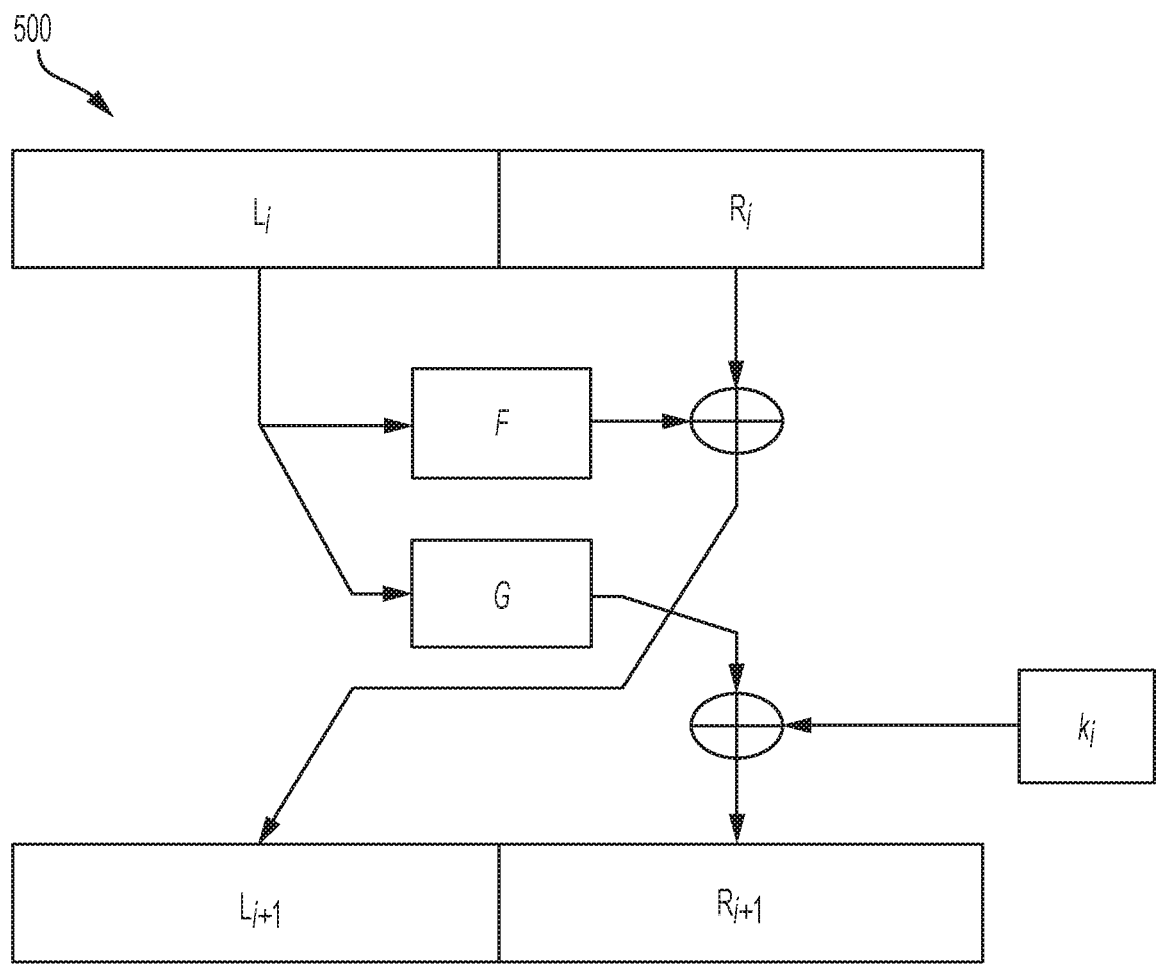
FIG. 5 illustrates one round of a "half key" variant of a double-mix Feistel network (DMFN), in accordance with various example implementations.

FIG. 5 illustrates one round of a DMFN 500 in accordance with example implementations of the present disclosure. In DMFN, the block size can be the larger one of the input and the output sizes, by repeating input bits or folding output bits as required for compressing or expanding bit-mixers. Specifically the data is handled in two halves L and R. In every round, Round$_i$, two functions F and G compute from $L_{i+1}$, $R_{i+1}$ from $L_i$ and $R_i$. The very first inputs $L_0$ and $R_0$ are set to the input of the bit-mixer while the very last values $L_r$, $R_r$ constitute the output. While is generated using a bitwise XOR operation of the output of F and $R_i$, a round key $k_i$ is mixed-in using a bitwise XOR operation with the output of G to generate $R_{i+1}$ as follows. For the DMFN, the updated left half ($L_{i+1}$) and updated right half ($R_{i+1}$) may be calculated for each round i=0, 1, ..., r−1:

$$L_{i+1}=F(L_i) \oplus R_i$$

$$R_{i+1}=G(L_i) \oplus k_i$$

In the preceding, the first inputs $L_0$ and $R_0$ are set to the input of the bit-mixer while the last values $L_r$, $R_r$ constitute the output, F and G represent first and second round functions, and $k_i$ represents the round key. The output at round r−1 may be updated block of data ($L_r$, $R_r$).

In the case of the Feistel network and/or DMFN of example implementations, the round function (F) may be a nonlinear function. The function may or may not be invertible, although the inverse should (but need not) be hard to compute (one-way function) in instances in which the first function is invertible. The security of the scheme may rely on the secrecy of the round key $k_i$, and on the requirements on F, that it is nonlinear and either has no inverse or has one that is hard to compute. The function may in some examples depend on the round (e.g., $F_i$), although in other examples, the first function may be independent of the round.

One example of a suitable round function (F) includes a plurality of logical NAND operations each of which is for a respective pair of shifted versions of the input left half, and a logical XOR for the respective outputs of the NAND operations. In the context of three NAND operations, the first function may include the following: a first NAND operation for a first pair of shifted versions of $L_i$, a second NAND operation for a second pair of shifted versions of $L_i$; a third NAND operation for a third pair of shifted versions of $L_i$; and a XOR operation for the respective outputs of the first, second and third NAND operations. In hardware implementations, these shifts or rotations may not consume time as they may be simply implemented with wirings. Thus, the first function may only require the time of two XOR gate delays, plus the delays of the two input NAND gates (although AND or NOR gates work equally well), which with optimized cell libraries, may be the time equivalent of four NAND2 gate delays. As used herein, a NOR gate is one which implements a Not-OR, a Negative-OR, or a Negated-OR logical function.

In the case of the DMFN, the second round function (G) may be invertible, although its inverse need not be easily computable. Similar to the first function (F), the second function may in some examples depend on the round (e.g., $G_i$), although in other examples, the second function may be independent of the round.

In some examples, a layer of nonlinear substitution boxes (s-boxes) may be used for the second function (G), which may make its mapping nonlinear. In other examples, the second function may perform circular shifts or rotations of the left half, which may then be mixed together and with the round key to calculate the updated right half. In a more particular example, the second function may produce three circular-shifted versions of the left half, and each three bits at the same positions of which may be XOR-ed together and with the bit of the round key in this position to produce a bit of the resulting, updated right half. In this regard, it may be shown that at block lengths=$2^n$ (where n is a positive integer), XORing any three circular shifted versions of the data defines an invertible function. Similar to the first function, in hardware implementations, these shifts or rotations may not consume time as they may be simply implemented with appropriate wirings. Thus, the second function and mixing operations may only require the time of two XOR gate delays, each of which with optimized cell libraries, may have the time equivalent of 1.5 to 3 NAND2 (2-input NAND) gate delays.

If an invertible bit-mixer, is needed, G (or every $G_i$) must to be an invertible function. The inverse of G need not easily be computed unless the inverse of the bit-mixer is also needed. As such it can be faster than typical nonlinear, invertible S-Box layers. An example of such a function G would be to XOR each input bit of G with two input bits from given circular distances ($d_1$, $d_2$). At power-of-two block lengths, when the output bits are computed as the XOR of 3 input bits from given circular distances, an invertible function is obtained. For hardware implementations, if $d_1$ and $d_2$ are not large such that the necessary routing is not excessively long, computing the function G and XOR-ing the round key takes minimal time.

If a nonlinear bit-mixer is needed, F must be a nonlinear function. F does not have to be invertible as its inverse is not needed even for the inverse of the bit-mixer, in the reverse direction. In one example implementations, a fast, sufficiently complex construction is used, which is nonlinear in the Galois field of binary polynomials, as follows:
 1. NAND two shifted versions of $L_i$ from circular distances $d_3$ and $d_4$
 2. NOR two other shifted versions of $L_i$ at circular distances $d_5$ and $d_6$
 3. NAND two yet other shifted versions of $L_i$ at circular distances $d_7$ and $d_8$
 4. XOR the above three blocks of bits to $L_i$ In hardware implementations, shifts are essentially free consuming little time. As such, F and G are nearly equal in path length requiring only a moderate amount manual effort to balance the critical timing paths, for reduced side channel leakage. It might be possible for F and G to be different in certain if not all rounds, or we can keep them the same in all rounds in our implementations.

Note that having an invertible function G, the DMFN is invertible: $L_i$ can be computed from bottom up, i.e. from $R_{i+1}$ $L_i$ can be computed, knowing the round key $k_i$ and the inverse of G. Having $L_i$, $F(L_i)$ can be computed, which is XOR-ed to $L_{i+1}$ to yield $R_i$. Invertibility is often a useful property. It ensures that all possible output values occur, and no two different input values gives the same output.

As described previously and shown on FIG. 5, half-length subkeys $k_i$ are mixed-in each round with G. We found no noticeable mixing improvements with subkeys of the full block length, e.g. if another half-length subkey was mixed-in with $R_i$, as shown on FIG. 6. Nevertheless, the constructions are different, and suitable for different applications.

Figure 6:
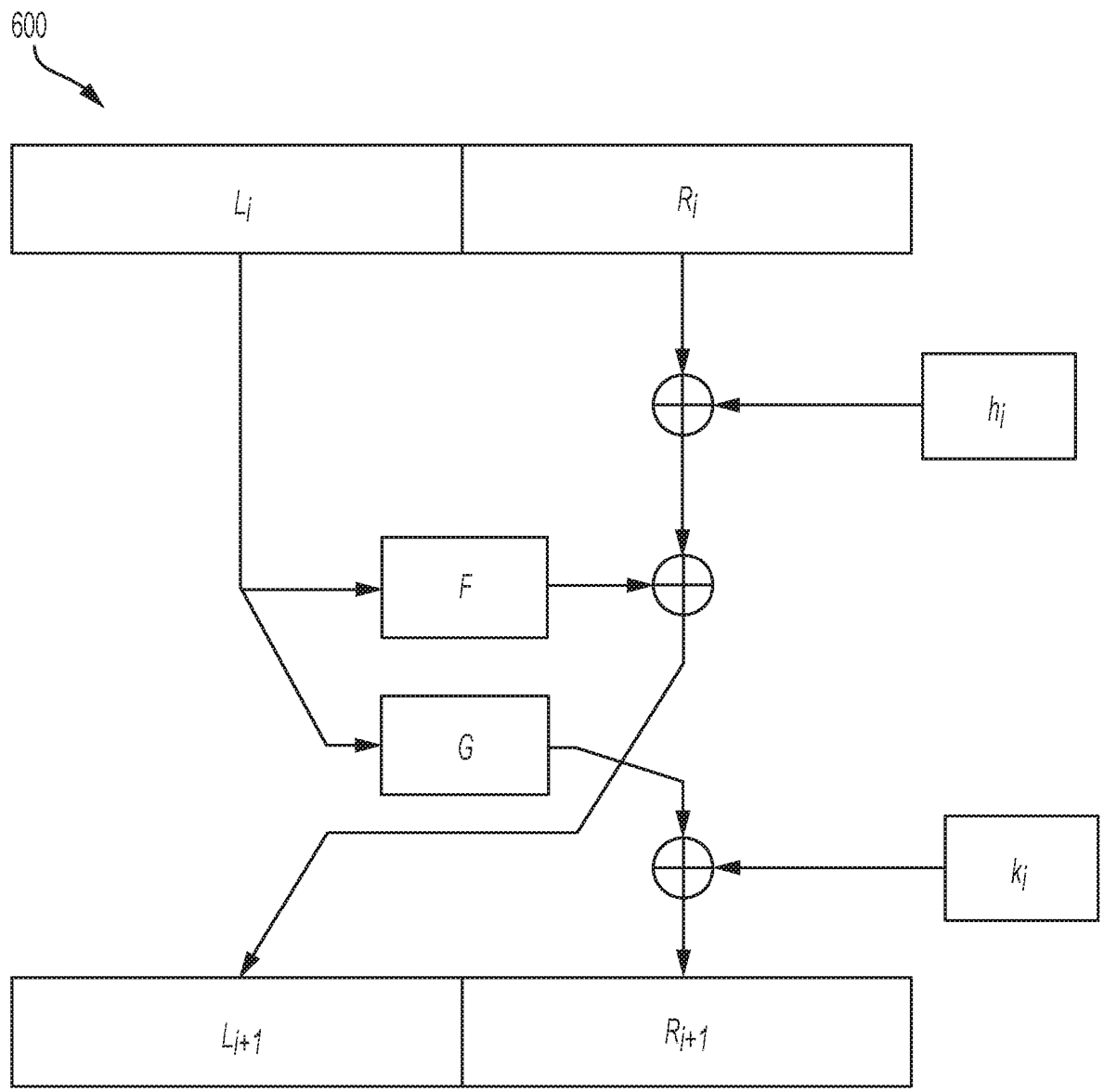
FIG. 6 illustrates one round of another DMFN variant, with "full-size key" in accordance with various example implementations.

Reference is now made to FIG. 6, which illustrates one round of a DMFN 600 in accordance with these other example implementations. In the DMFN, by applying the round key $k_i$ to alter $R_{i+1}$ instead of $L_{i+1}$, the work calculating the two halves may be balanced. That is, the two halves may become available in the same time. But $R_i$ may be unused while the first function (F) is applied. Thus, as shown in FIG. 6, $R_i$ may be mixed with another round key $h_i$ without upsetting the balance. And both $R_{i+1}$ and $L_{i+1}$ may be influenced by key material. The DMFN shown in FIG. 6 may achieve better overall mixing properties when functions of similar complexity are chosen for the first function (F) and second function (G). In yet other examples such as in instances in which the second function is slower to calculate than the first function, the mixing in of $k_i$ may be omitted, which may result in a scheme similar to the DMFN shown in FIG. 5 in mixing properties, but slightly faster. For the DMFN, the updated left half ($L_{i+1}$) and updated right half ($R_{i+1}$) may be calculated for each round l=0, 1, . . . , r−1:

$$L_{i+1} = F(L_i) \oplus R_i \oplus h_i$$

$$R_{i+1} = G(L_i) \oplus k_i$$

In the preceding, the first inputs $L_0$ and $R_0$ are set to the input of the bit-mixer while the last values $L_r$, $R_r$ constitute the output, F and G represent first and second round functions, and $k_i$ and $h_i$ represent round keys. The output at round r−1 may be the output of the bit-mixer, the updated block of data ($L_r$, $R_r$).

Invertible versions of bit-mixers based on the well-known substitution-permutation networks can also be used. Similar to the Feistel network and DMFN, the substitution-permutation network of example implementations may be performed in iterations (or rounds). For example, for a round (i), an input block of data ($D_i$) may be mixed (e.g., XOR-ed) with a round key ($k_i$), and the result may be mixed through a substation layer including a plurality of S-boxes ($S_i$), and a linear transformation layer including a permutation ($P_i$), to produce an updated block of data ($D_{i+1}$). In another example, the input block of data may be first mixed through the substitution and linear transformation layers to produce the updated block of data, which may then be mixed with the round key ($k_i$). In either example, either or both of the S-boxes and permutation may depend on or be independent of the round. And in some examples, at least two of the S-boxes for at least one of the rounds may be different. In one example implementation, the initial block of data ($D_0$) may be only a subset of a larger block of data that also includes at least one other subset ($B_0$). The round key ($k_i$) may be mixed (e.g., XOR-ed) with the other subset ($B_0$) to produce a mixed round key, and it may be mixed with the input block of data ($D_i$) for the round. Or in another example, the round key may be mixed with the other subset, and the resulting mixed round key may be mixed with the updated block of data ($D_{i+1}$) after the substitution and linear transformation layers.

Figure 7:
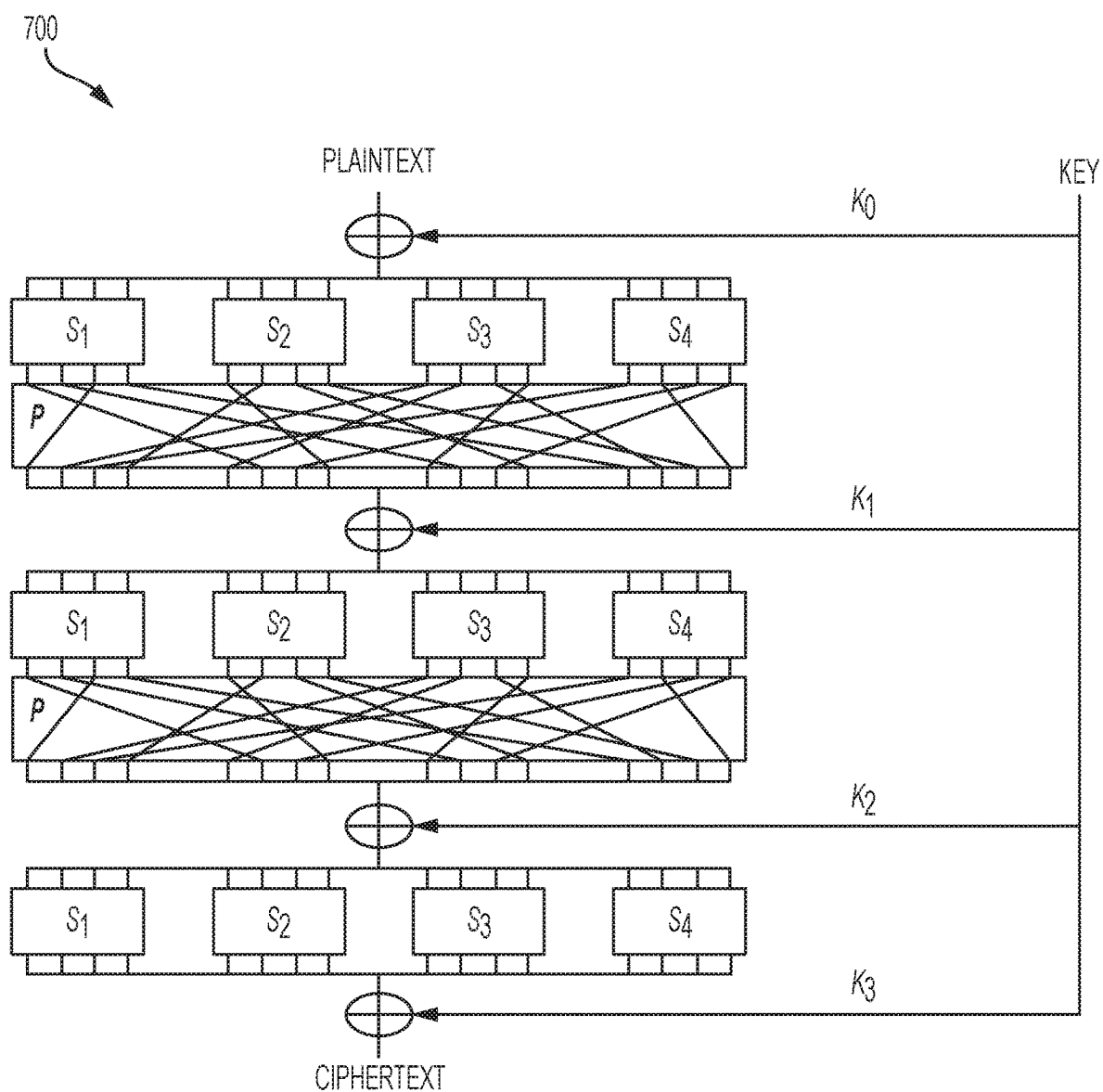
FIG. 7 illustrate one round of a substitution-permutation network, in accordance with various example implementations.

FIG. 7 illustrates three rounds of a substitution-permutation network 700 in accordance with example implementations of the present disclosure. Invertible versions of bit-mixers based on the well-known substitution-permutation networks can be used. For compression or expansion variants, the block size is chosen to be the larger of the desired input and output block sizes. If the input size is smaller, the unused input bits can be kept constant or repeated input bits used until it matches the output size. If the required output size is smaller, we can discard output bits or fold certain bits together via XOR or other appropriate function to produce the final output. Substitution-Permutation (SP) networks are customarily built according to FIG. 7 with several iterations of the following 3 steps:

1. The input is transformed by a series of nonlinear functions, S-Boxes
2. The bits of the result are rerouted/permuted
3. The permuted data is XOR-ed with a round key/subkey Note: The first and last round are often simplified, omitting one or two steps If the S-Boxes are invertible, the SP Network is invertible. If the S-Boxes are nonlinear, the SP network is nonlinear. SP networks can be arbitrarily wide where the number of rounds required for a thorough mixing depends on its width. In hardware implementations, small S-Boxes tend to yield faster bit-mixers. The smallest practical S-Box, one with 3 input bits and 3 output bits, is implemented in PRINTcipher, as described by Lars Knudsen, Gregor Leander, Axel Poschmann, Matthew J. B. Robshaw. PRINTcipher: A Block Cipher for IC-Printing. Cryptographic Hardware and Embedded Systems, CHES 2010 Volume 6225 of the series Lecture Notes in Computer Science, pp 16-32. The three output bits of this 3×3 S-Box are defined as follows:

$$F0=AB'C'+A'(C+B)$$

$$F1=A'BC+B'(C'+A)$$

$$F2=ABC'+C(B'+A')$$

Figure 8C:
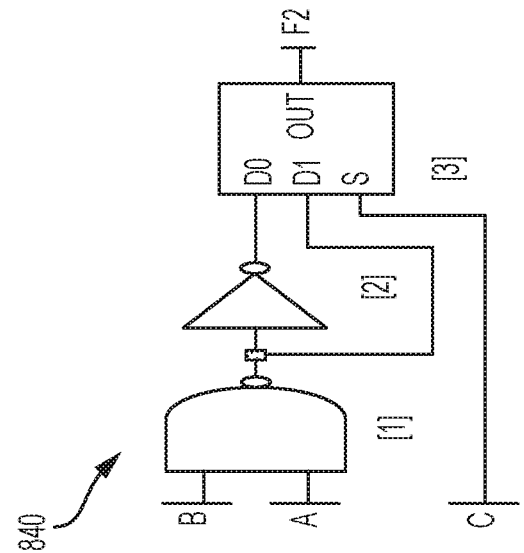
FIGS. 8A-8C illustrate three components of a respective S-box that can be used in FIG. 7.
Figure 8B:
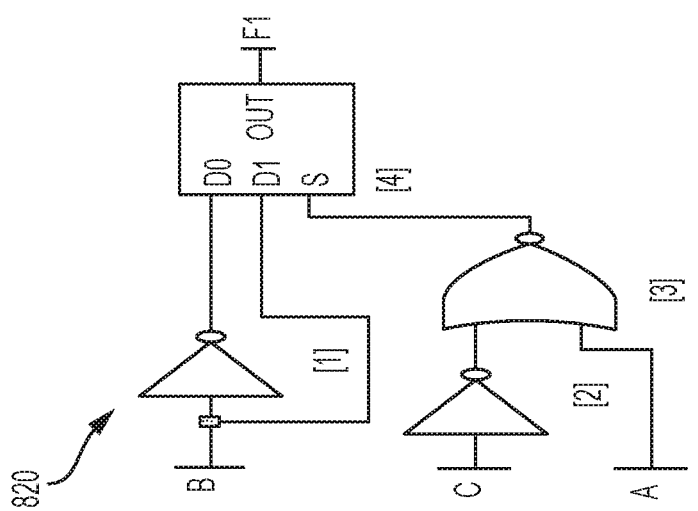
Figure 8A:
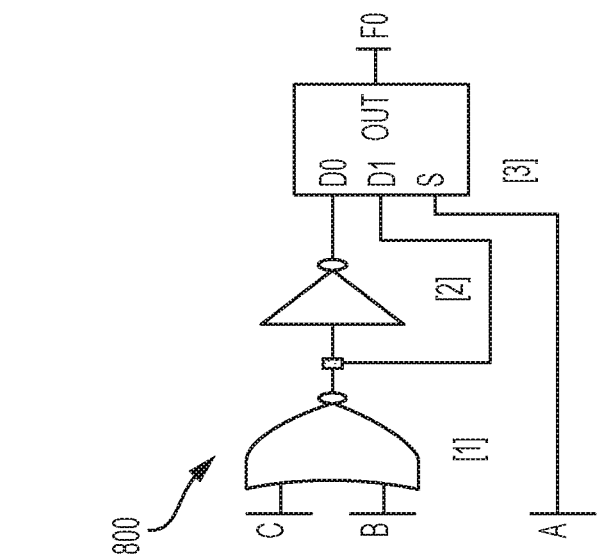

FIGS. 8A-8C shows respective small and fast circuits that can be used to implement this S-Box, where 800 shows a circuit for computing F0, 820 shows a circuit for computing F1, and 840 shows a circuit for computing F2. They require only a handful of gates for each output bit.

Similarly, the PRESENT cipher, as described by A. Bogdanov, L. R. Knudsen, G. Leander, C. Paar, A. Poschmann, M. J. B. Robshaw, Y. Seurin, C. Vikkelsoe. PRESENT: An Ultra-Lightweight Block Cipher. Cryptographic Hardware and Embedded Systems—CHES 2007. Volume 4727 of the series Lecture Notes in Computer Science pp 450-466, implements 4×4 S-Boxes as follows:

$$F0=A'BC'+ACD+A'BD'+AB'C'+AC'D';$$

$$F1=A'B'C+BC'D+AB'C'D'+ABC+BCD';$$

$$F2=ABC'+AC'D+A'B'D'+A'BC+A'BD;$$

$$F3=A'BD+A'C'D+ABD'+AC'D'+AB'CD+A'B'CD';$$

Figure 9:
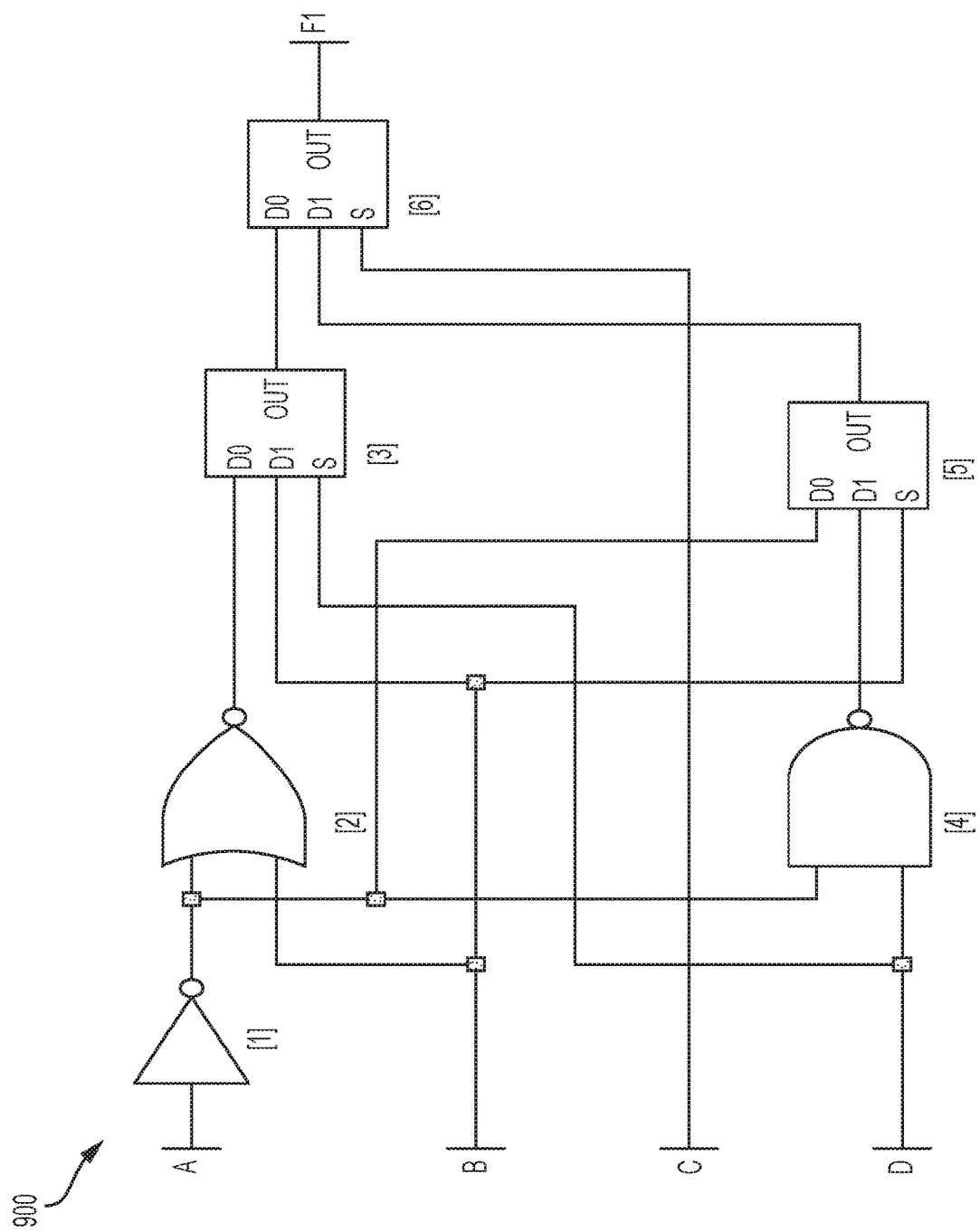
FIG. 9 illustrates one component of another S-Box that can be used in FIG. 7.

FIG. 9 shows an exemplary circuit design 900 that can be used to implement one of the four output signals. This S-Box requires slightly more gates for each output. Other 4×4 S-Box designs can be used that achieve similar performance and mixing properties. Simpler, faster S-Boxes can also be implemented, however they require additional rounds to achieve the same thorough mixing properties, which effectively reduces the overall performance of the bit-mixer.

Suitable permutations, which are used in ciphers such as PRINTcipher, PRESENT and AES, as well as in hash functions such as SHA3 can be used. The simple permutation used by the first two ciphers listed above achieves perfect dispersion of their input bits in the first few rounds; the bits affected by a single input bit change are fed into different S-boxes. This permutation, where the input block size to be mixed is b and the width of the S-Box is s, is defined as follows:

$$P(i)=s \cdot i \bmod b-1 \text{ for } 0 \leq i \leq b-2; \text{ and } P(b-1)=b-1$$

An m-by-m perfect S-Box distributes a single input bit change to m bits of the next round. With a proper permutation, these bits are routed to different S-Boxes of the next round, distributing the changes to $m^2$ bits. After r rounds, a single bit change in the input affects $m^r$ output bits until all bits are affected. We want $m^r \geq n$, that is, $r \geq \log(n)/\log(m)$, such that a single input bit change affects all output bits. Naturally, more rounds will achieve more thorough mixing.

In an example implementation of an SP network using PRINTcipher S-Boxes, the input and output width are set to 255 bits. To achieve perfect mixing, the theoretical minimum number of rounds required is $r=\log(255)/\log(3) \approx 5$. Statistical tests on trials of 1000 random key sets indicated that more rounds are needed. Nine rounds were always sufficient to achieve statistically perfect mixing. Executing 9 rounds in a single clock cycle, as needed in the worst case, allows clock rates upwards of 450 MHz. In another example implementation of an SP network using the PRESENT cipher S-Boxes, the input and output width are set to 256 bits. To achieve perfect mixing, the minimum number of rounds required is $r=\log(256)/\log(4)=4$. Statistical tests on trials of 1000 random key sets indicated that 6 rounds are sufficient to achieve statistically perfect mixing. Even at a worst case 6 rounds, SP networks using the PRESENT cipher S-Box require 3 fewer rounds than those that utilize the PRINTcipher S-Box and mix in each round more thoroughly, farther from any linear function. The difference in rounds yields a performance increase, with executing all 6 rounds in a single clock cycle allowing clock rates upwards of 500 MHz.

Figure 10:
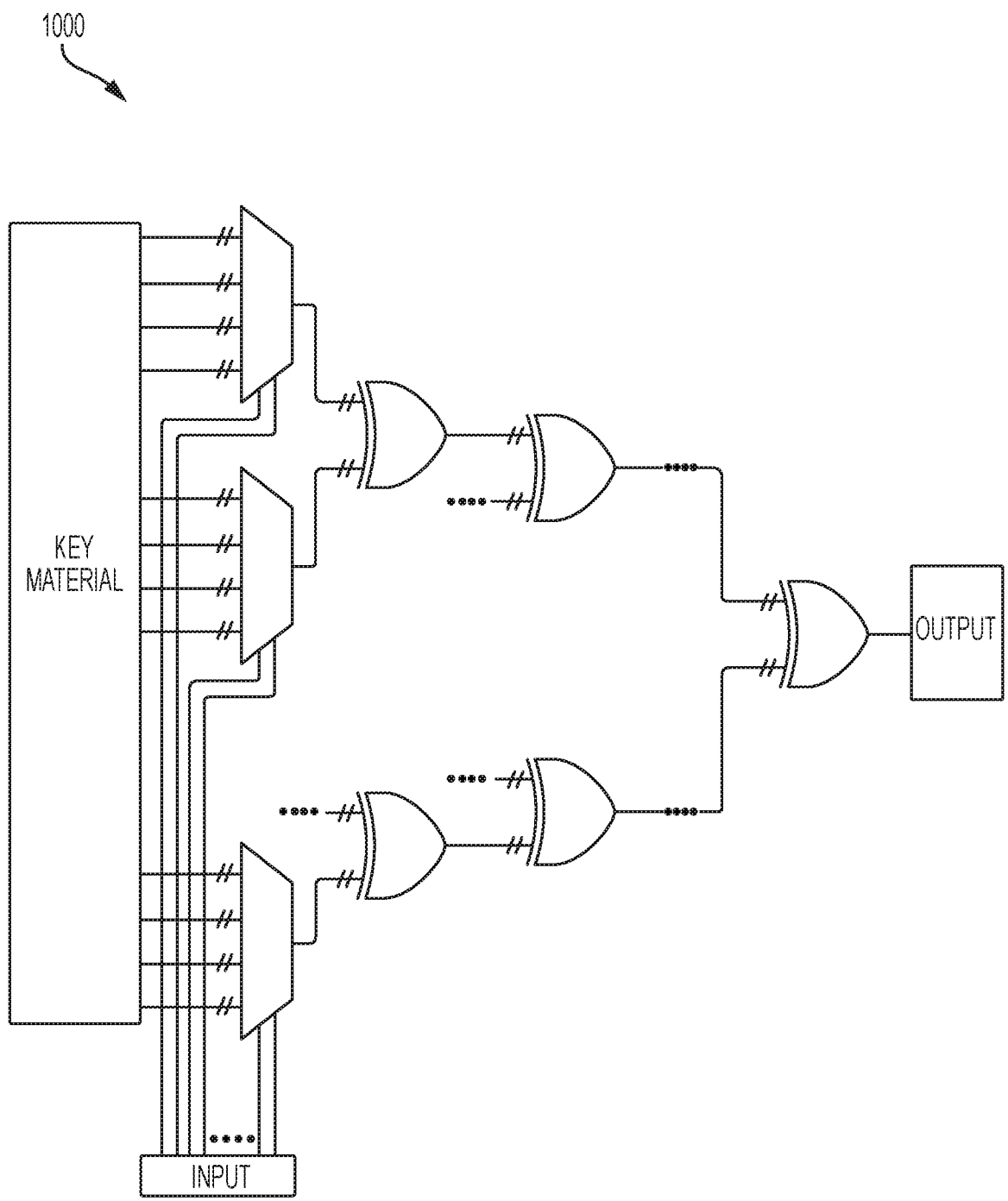
FIG. 10 illustrates a binary tree of exclusive-or (XOR) operations together with a "subkey" selection layer, in accordance with various example implementations.

FIG. 10 illustrates an XOR tree 1000 in accordance with various example implementations. In accordance with examples using an XOR tree, the mixing function may be based on secret random numbers (e.g., KMS 324) and the input block of data. In this regard, the sub-keys may be blocks of secret random numbers in a sequence of blocks at positions corresponding to those of certain bits in the input block of data, such as those bits having a binary value of one (or alternatively zero). The sub-keys may then be mixed together using an XOR tree.

As shown in FIG. 10, the XOR tree 1000 may include a plurality of XOR logic gates that may be implemented to carry out a data merger operation. In FIG. 10, each of the logic gates represents a series of gates, one for each bit of the subkeys on which they operate.

In XOR-tree based bit-mixers, the input is partitioned into multiple, arbitrary length, non-empty sets of consecutive bits, forming bit groups. The bits from each group select a subkey from the key material using multiplexers, the outputs of which are bitwise XOR-ed together to generate the final bit-mixer output. While the XOR operation is typically implemented using a tree of 2-input XOR gates in ASICs, multi-input gates or parity generation circuits can be used depending on the target technology, e.g. in FPGAs that provide wide lookup tables. Bit-mixers of this construction are not only straightforward to implement, but offer high performance, low power consumption, improved security, and a minimal side channel attack surface.

As the width of the input and the width of the output of XOR-tree based bit-mixers can be independently chosen, expansion and compression functions are created by selecting a longer output width or longer input width, respectively. Having random key material, any single input bit change will cause the output to change by a random subkey. As such, every output bit is influenced by any input bit change. Further, given the bit-mixers construction, multiple input bit changes will cause the output to change by an XOR-ed aggregation of random subkeys which is in itself random. In total, XOR-tree based bit-mixers satisfy each of the desired properties discussed above and ensures theoretically perfect mixing.

In one example implementation, a circuit was evaluated in ASIC, which expanded from an 80-bit input into a 256-bit output utilizing 2-to-1 multiplexers for subkey selection and 2-input XOR gates to implement a seven level XOR-tree. Even with the limited fanout/loading of the gates within the circuit, the bit-mixer circuit can easily operate in a single clock cycle in systems with clock rates in excess of 1.2 GHz.

The XOR-tree construction is linear in a binary Galois field, because it only uses bit selection and XOR operations. In these constructions some 4-way correlations exist among certain output values computed from simply correlated input values. In this instance, correlations arise as follows. Assuming at least 2 input bit-groups, choose a bit b from one of the input bit-groups B, and bit c from a different input bit-group C. Holding all bits of group B except b constant, let K0 denote the subkey selected when b is logic 0 and K1 denote the subkey selected with b is logic 1. Similarly, let L0 and L1 denote the subkeys selected based on the logical value of c while other bits of group C are held constant. Finally, let M denote the XOR of all subkeys selected by other input bit-groups where their inputs are held constant (0 if there is no more bit-group). The XOR of the output values resulted from all possible 2×2 values of b and c will yield 0, what we call a "4-way correlation".

$$(M \oplus K0 \oplus L0) \oplus (M \oplus K1 \oplus L0) \oplus (M \oplus K0 \oplus L1) \oplus (M \oplus K1 \oplus L1) = 0$$

In applications where the output values cannot be observed, this type of correlation does not pose problems to the security of the circuit. For applications where this correlation is a concern, the output can be further processed by a nonlinear function such as: A parallel collection nonlinear functions such as S-Boxes; The outputs of a collection of nonlinear functions such as S-Boxes XOR-ed with the original output; Rotate-Add-XOR (RAX) constructions (suitable for microprocessor implementations). Another way to make the construction nonlinear, is to replace the XOR operations in one or more levels of the XOR-tree with k-to-1 nonlinear S-Boxes similar to the one shown in FIG. 9. While straightforward to implement, the additional uneven circuit delay may require manual signal propagation balancing for low side channel leakage. With moderate effort, replacing one level of the XOR-tree with S-Boxes achieves single clock cycle operation at clock rates upwards of 1.0 GHz.

Returning now to FIGS. 2 and 3, at write operation at a memory location in the window of memory locations in the memory 204 according to example implementations may include the microprocessor core 202 generating a request for data at a memory location having a respective address, and providing that address to the memory 204 on the first bus 208. Of course, rather than receiving the address from the microprocessor core, the address may be provided from some other requestor such as a direct memory access (DMA) controller.

The received address may also be provided to the SMTU 206. In some examples, the address may be a logical address, and may be translated by the address translation unit 314 to a physical address. The address may be provided through the transaction control unit 312 to the key generator 318, which may functionally include three key generators, at times referred to herein as key generators W, C and D configured or operable to generate respective keys W, C and D. Each of the three key generators may also receive the random numbers earlier stored or generated in the KMS 324. Stored at the memory location is the write counter value (e.g., data version value), data authentication tag and block of ciphertext, and this information may be provided to the transaction control unit. In some examples, the write counter value may be encrypted, and this encryption can be very simple, and its key can be a predefined constant, without significant loss of security.

The encryption unit 320 or another component of the SMTU 206 may decrypt the write counter value using key W. The encryption unit may decrypt the ciphertext using key C, while the transaction control unit may employ the data-hashing unit 322 to verify the integrity of the ciphertext based on the ciphertext, key D and data authentication tag, and in some examples. Assuming that the integrity of the ciphertext is verified, the decrypted ciphertext (now plaintext) may be rewritten to the memory location. On the other hand, instances in which the ciphertext authenticity is not verified may signal an error.

In instances in which an error occurs, it may indicate that a random error or possible data tampering has occurred, and the transaction control unit 312 may perform any of a number of different actions in response. For example, the transaction control unit may cause the system 200 to (i) stop processing all read and write requests, (ii) delete the random number used for encryption in the current session, (iii) flush all registers that participated in key generation activities, (iv) trigger a memory flush to overwrite the content of the memory window with all zeros, or (v) take other action. In another example, the transaction control unit may maintain a fault counter, which may be incremented in response to an error. In this approach, if a threshold of the number of errors is reached, the transaction control unit may cause any one or more of the aforementioned actions. This approach may be useful in a noisy environment where random memory read errors occasionally occur.

In some examples, a write operation at a memory location in the memory 204 may be preceded by a read operation at the memory location, such as that described above, to verify that the data stored at the memory address is authentic. If prior read is performed, only if the read operation establishes the authenticity of the data, does a write operation occur. In some examples, then, the write operation may include the transaction control unit 312 being configured or operable to merge new data to be written with the decrypted ciphertext (plaintext).

The transaction control unit 312 being configured or operable to increment a GWC, and provide the updated value to each of key generators C and D of key generator 318. Using the incremented write counter value and the address of the memory location, key generators C and D may generate new keys C and D, and provide the keys to the encryption unit 320 and data-hashing unit 322, respectively. The encryption unit may use new key C to encrypt the merged plaintext to produce new ciphertext, and the data-hashing unit may use the reproduced ciphertext and key D to produce a new data authentication tag. The combination of key Wand the incremented GWC value may be used to provide an encrypted write counter value. The resulting write counter value, data authentication tag and ciphertext may then be returned and written to the memory location.

Figure 11:
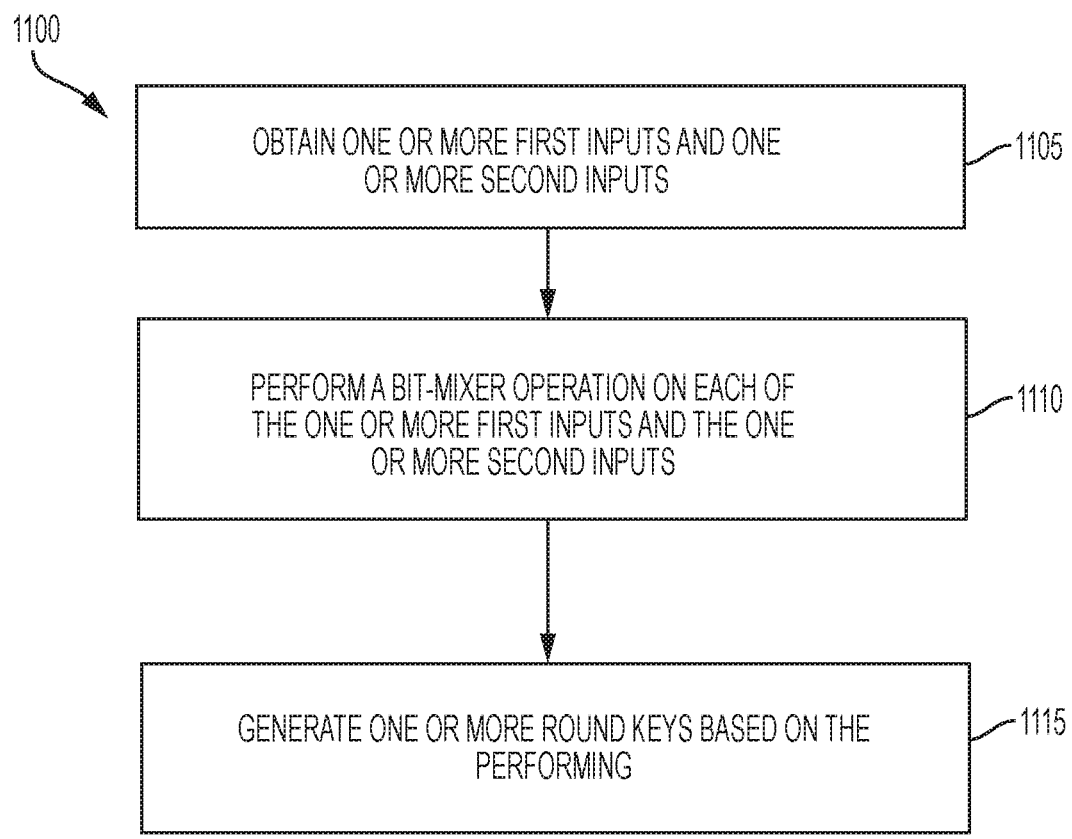
FIG. 11 illustrates a flowchart including various operations in a method according to example implementations.

FIG. 11 illustrates various operations in a method 1100 of providing security in a computer system, according to example implementations of the present disclosure. The security can be provided by generating one or more round keys for a cipher performing cryptographic operation. As used herein, a cryptographic operation includes one or more cryptographic functions. At 1105 the method begins by obtaining one or more first inputs and one or more second inputs. In some examples, the one or more first inputs can comprise a plurality of equal sized subkeys from a key material that is divided into a plurality of equal sized key material sub-blocks or a cipher key and the one or more second inputs can comprise a randomly generated fixed input, one or more previous round keys or a round number. In some examples, the one or more first inputs can be generating from a shorter key by applying a cryptographic function, a bit-mixer with hard coded key material, a counter input, or combinations thereof. In some examples, the cryptographic function can comprise a cipher, a hash function, or a stream generator. In some examples, the material is secret, and shared between communicating parties. The key material can be hardcoded. It can be randomly generated and stored. In some examples, the cipher key is combined with hardcoded key material by exclusive-OR (XOR) operation on portions of the cipher key with portions of the key material.

At 1110, the method continues by performing, by at least one electronic circuit, a bit-mixer operation on each of the one or more first inputs and the one or more second inputs. In some examples, the bit-mixer operation comprises an exclusive-OR (XOR) tree, a substitution-permutation network, or a double-mix Feistel network, or a Rotate-Add-XOR (RAX) construction. In some examples, the XOR tree comprises a plurality of negated-AND (NAND) gates or a plurality of multiplexers as the first layer of the XOR tree. The bit-mixer operation is selected to have the properties comprising every input bit affects every output bit, changes in the input bit cause, on average, half of output bits to change; changes in the input bits yield output values without correlation to the input bits or to a change pattern of the input, keys are employed to make their behavior unpredictable to an observer not knowing the keys, and the fixed lengths of the input and output values can be independently and arbitrarily chosen.

In the example where the bit-mixer operation comprises a XOR tree, the method further comprises performing a negative-AND (NAND) logical operation on each first input of the one or more first inputs with each second input of the one or more second inputs to select which of the plurality of first inputs to input into an XOR logical operation, wherein an output of the XOR tree produces an output with respect to the plurality of first inputs that are used as inputs.

In the example where the bit-mixer operation comprises a substitution-permutation network, the method further comprises performing a non-linear substitution operation on each of the plurality of first inputs; performing a permutation operation on each output of the non-linear substitution operation; performing a bitwise XOR operation on each output of the permutation operation with the one or the first inputs or one of the second inputs.

In the example where the bit-mixer operation comprises a double-mix Feistel network, each of the one or more first inputs are divided into an initial left half and initial right half, the method further comprises calculating an updated left half and an updated right half for each round of a plurality of rounds, wherein the calculating the updated left half comprises applying a first function to an input left half to produce a first result, and mixing the first result with an input right half, wherein calculating the updated right half comprises applying a second function to the input left half to produce a second result, and mixing the second result with a round key, and wherein the input left half and input right half are the initial left half and initial right half for a first of the plurality of rounds, and the updated left half and updated right half for an immediately preceding round for each round thereafter.

At 1115, the method proceeds to generate, by at least one electronic circuit, one or more round keys based on the performing. In some examples, the generating further comprising performing a scrambling operation on an output of the performing. In some examples, the method further comprises producing a block of data with the one or more round keys. In some examples, the method further comprising repeating the performing and the generating the one or more round keys for a cryptographic cipher.

In some examples, a block of cipher text can be produced using the plurality of sub-keys. The cipher text can be produced by modifying an existing cipher C, making it a faster and more secure cypher D. In this example, an iterative cipher C (working in "rounds") is chosen. The iterative cipher C can be, but is not limited to, DES, TDES, AES, etc. A bit-mixer B is chosen with the output size the same as the size of the round keys of C. The bit-mixer B can be, but is not limited to, the XOR-tree, the SP network, the DMF network, as discussed above. A fixed key material M is chosen for the bit mixer B, where M can be chosen arbitrarily, avoiding simple non-random patterns. M can be randomly generated, and distributed among all communicating parties, which will use D. C has a round-key generator function F, of input of some of the previous round keys (the cipher key is the first input). F is replaced with B to transform C to D. The input size of B can be larger than its output size (compression function). In this case, the extra bits can be filled with the value of the round counter, and possibly with multiple previous round-keys and possibly with the cipher key.

Even though a cryptographic function may be mathematically secure, its physical implementation could leak information about the data and or keys via side channels. Side channels include response time variations, electromagnetic emanations, fluctuations in power consumption, even varying voltage levels on device pins. Because the functions described above can be implemented in hardware using only simple combinatorial logic gates, side channel leakage is minimized. More pointedly, as the circuits do not require structures that are typically the main source of side channel leakage such as flip-flops, latches and other types of storage devices, the circuits are less susceptible to side channel analysis.

What leakage that may still exist can also be masked using manual layout techniques to balance the already highly symmetric internal signal paths, thereby ensuring that many concurrent switching events occur at almost exactly the same time. This balancing step may not be necessary, because switching transients in test conducted by the inventors for ASIC's of 32 nm SOI target technology are in the picoseconds. As such, recording/analyzing information leaked from such transients in an effort to mount a template attack would require a data acquisition system with a sampling rate in the THz range, an order of magnitude faster than available in the foreseeable future. Using a DPA side channel analysis workstation, no exploitable side channel leakage such as correlations between power traces and output bits given varying input bits was measured.

While different subkeys taken from the key material can share bits, there are a few restrictions. One such restriction for XOR-tree bit-mixers is that the same key material bit must not appear in the same position of multiple subkeys selected by different input bit groups as the XOR operations could effectively cancel this bit. That in mind, a simple bit reuse method is to generate several subkeys by bit-rotating another subkey. This as well as more complex key material mappings can be used to reduce the size of the key storage or minimize the bandwidth required to distribute keys.

Another solution for efficient key distribution given limited bandwidth employs a second bit-mixer with hard coded key material. From a shorter key the second bit-mixer can iteratively generate subkeys for the first bit-mixer. Ciphers and cryptographic hash functions can also be used iteratively to fill the key material storage before use.

While the bit-mixers listed above were optimized for hardware implementation, there are constructions which work well when implemented in software. Even though single clock cycle operation is not possible, the above example bit-mixers can still be orders of magnitude faster in software than ciphers or hash functions of similar input and output sizes. When no high security, only statistical independence of some generated data is required, one can save significant computation time even with software bit-mixers.

By way of one example, a family of bit-mixers well suited for software implementation can be based on Rotate, Add, XOR (RAX) constructions. Below is a 64-bit example in C. The constants are hard coded subkeys, to be replaced with subkeys from the key storage. In the following example, the function ROL is ROtate-Left, L and R are small constants, e.g. 4 and 9, and the internal variable k is initialized to 0:

$x=(k+=0x3779884922721DEB);$ $x=(x\char`\^ROL(x,L)\char`\^ROL(x,R))+0x49A8D5B36969F969;$ $x=(x\char`\^ROL(x,L)\char`\^ROL(x,R))+0x6969F96949A8D5B3;$ $x=(x\char`\^ROL(x,L)\char`\^ROL(x,R));$ There are many other information security applications, where bit-mixers can be beneficial. If not only their keys, but also the input and/or the output of the bit-mixers remain hidden from an observer, there are no special security requirements, or the security requirements are less stringent than at ciphers or other cryptographic functions, which have been designed for high security at visible input and output. Hardware bit-mixers are very fast, and produce statistically uncorrelated output from correlated input, with low side channel leakage. These properties, when bit-mixers are used in cryptographic functions, improve their security.

For simplicity and illustrative purposes, the principles of the present teachings are described by referring mainly to example implementations thereof. However, one of ordinary skill in the art would readily recognize that the same principles are equally applicable to, and can be implemented in, all types of information and systems, and that any such variations do not depart from the true spirit and scope of the present teachings. Moreover, in the foregoing detailed description, references are made to the accompanying figures, which illustrate specific example implementations. Electrical, mechanical, logical and structural changes may be made to the example implementations without departing from the spirit and scope of the present teachings. The foregoing detailed description is, therefore, not to be taken in a limiting sense and the scope of the present teachings is defined by the appended claims and their equivalents.

The terms and descriptions used herein are set forth by way of illustration only and are not meant as limitations. For example, although methods has been described in top to bottom fashion, the steps of the method may be performed in a different order than illustrated or simultaneously. Furthermore, to the extent that the terms "including", "includes", "having", "has", "with", or variants thereof are used in either the detailed description or the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible.

Other implementations consistent with the present teachings will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A method for generating one or more round keys for a cryptographic operation for encrypting data in a communication system, the method comprising:

generating one or more first inputs from a shorter key by applying a first bit-mixer operation with hardcoded key material or a round counter input that is part of a round of a block cipher cryptographic algorithm;

obtaining the one or more first inputs and one or more second inputs, wherein the one or more first inputs comprise a plurality of equal sized subkeys from a key material having a first length that is divided into a plurality of equal sized key material sub-blocks or a cipher key having a second length and the one or more second inputs comprise a round number having a third length that is shorter than the first length and the second length;

expanding the third length of the round number to be equal to the first length or the second length by shuffling and repeating bits of the round number;

selecting a second bit-mixer operation, wherein the second bit-mixer operation has properties comprising every input bit affects every output bit, changes in the input bit cause half of output bits to change; changes in input bits yield output values without correlation to the input bits or to a change pattern of the input, keys are employed to make their behavior unpredictable to an observer not knowing the keys, and fixed lengths of the input bits and output values are independently and arbitrarily chosen;

performing, by at least one electronic circuit, the second bit-mixer operation on each of the one or more first inputs and the one or more second inputs;

performing a first scrambling operation on an output of the performing of the second bit-mixer operation using an XOR tree;

generating, by at least one electronic circuit, one or more round keys based on the performing the first scrambling operation; and encrypting the data using the one or more round keys that were generated.

2. The method of claim 1, wherein the key material is secret and shared between communicating parties, hardcoded, or randomly generated.

3. The method of claim 1, wherein the cipher key is combined with hardcoded key material by exclusive-OR "XOR" operation on portions of the cipher key with portions of the hardcoded key material.

4. The method of claim 1, further comprising producing a block of data with one or more previously generated round keys.

5. The method of claim 1, further comprising repeating the performing and the generating the one or more round keys for a cryptographic cipher.

6. The method of claim 1, wherein the second bit-mixer operation comprises an exclusive-OR "XOR" tree comprising a plurality of negated-AND "NAND" gates or a plurality of multiplexers for selecting data to be merged, a substitution-permutation network, or a double-mix Feistel network, or a Rotate-Add-XOR "RAX" construction.

7. The method of claim 6, wherein the XOR tree further comprises:
performing a negative-AND "NAND" logical operation on each first input of the one or more first inputs with each second input of the one or more second inputs to select which of the plurality of first inputs to input into an XOR logical operation, wherein an output of the XOR tree produces output with respect to the plurality of first inputs that are used as inputs.

8. The method of claim 7, further comprising performing a second scramble operation to the output of the XOR tree to make the second bit-mixer operation nonlinear.

9. The method of claim 6, wherein the substitution-permutation network further comprises:
performing a non-linear substitution operation on each of the plurality of first inputs;
performing a permutation operation on each output of the substitution operation; and
performing a XOR operation on each output of the permutation operation with the one of the first inputs or one of the second inputs.

10. The method of claim 6, wherein, in the double-mix Feistel network, each of the one or more first inputs are divided into an initial left half and initial right half, the method further comprises:
calculating an updated left half and an updated right half for each round of a plurality of rounds,
wherein the calculating the updated left half comprises applying a first function to an input left half to produce a first result, and mixing the first result with an input right half, wherein calculating the updated right half comprises applying a second function to the input left half to produce a second result, and mixing the second result with a round key, and
wherein the input left half and input right half are the initial left half and initial right half for a first of the plurality of rounds, and the updated left half and updated right half for an immediately preceding round for each round thereafter.

11. A system for generating one or more round keys for a cryptographic operation for encrypting data in a communication system, the system comprising one or more logic circuits operable to:
generate one or more first inputs from a shorter key by applying a first bit-mixer operation with hardcoded key material or a round counter input that is part of a round of a block cipher cryptographic algorithm;
obtain the one or more first inputs and one or more second inputs, wherein the one or more first inputs comprise a plurality of equal sized subkeys from a key material having a first length that is divided into a plurality of equal sized key material sub-blocks or a cipher key having a second length and the one or more second inputs comprise a round number having a third length that is shorter than the first length and the second length;
expand the third length of the round number to be equal to the first length or the second length by shuffling and repeating bits of the round number;
select a second bit-mixer operation, wherein the second bit-mixer operation has properties comprising every input bit affects every output bit, changes in the input bit cause half of output bits to change; changes in input bits yield output values without correlation to the input bits or to a change pattern of the input, keys are employed to make their behavior unpredictable to an observer not knowing the keys, and fixed lengths of the input bits and output values are independently and arbitrarily chosen;
perform, by at least one electronic circuit, the second bit-mixer operation on each of the one or more first inputs and the one or more second inputs;
perform a first scrambling operation on an output of the performing of the second bit-mixer operation using an XOR tree;
generate, by at least one electronic circuit, one or more round keys based on the scrambling operation; and
encrypting the data using the one or more round keys that were generated.

12. The system of claim 11, wherein the cryptographic operation comprises a cipher, a hash function, or a stream generator.

13. The system of claim 11, wherein the second bit-mixer operation comprises an exclusive-OR "XOR" tree, a substitution-permutation network, or a double-mix Feistel network, or a Rotate-Add-XOR "RAX" construction.

14. The system of claim 11, wherein the key material is secret and shared between communicating parties, hardcoded, or randomly generated.

15. The system of claim 11, wherein the cipher key is combined with hardcoded key material by exclusive-OR "XOR" operation on portions of the cipher key with portions of the hardcoded key material.

16. The system of claim 11, wherein the one or more logic circuits are further operable to repeat the performing and the generating the one or more round keys for a cryptographic cipher.

17. The system of claim 13, wherein in the XOR tree the one or more logic circuits are further operable to perform a negative-AND "NAND" logical operation on each first input of the one or more first inputs with each second input of the one or more second inputs to select which of the plurality of first inputs to input into an XOR logical operation, wherein an output of the XOR tree produces output with respect to the plurality of first inputs that are used as inputs.

18. The system of claim 17, wherein the one or more logic circuits are further operable to perform a second scramble operation on the output of the XOR tree to make the bit-mixer operation nonlinear.

19. The system of claim 13, wherein in the substitution-permutation network the one or more logic circuits are further operable to:
perform a non-linear substitution operation on each of the plurality of first inputs;
perform a permutation operation on each output of the substitution operation; and
perform a XOR operation on each output of the permutation operation with the one of the first inputs or one of the second inputs.

20. The system of claim 13, wherein in the double-mix Feistel network, each of the one or more first inputs are divided into an initial left half and initial right half, the one or more logic circuits are further operable to:
calculate an updated left half and an updated right half for each round of a plurality of rounds,
wherein the calculate the updated left half comprises applying a first function to an input left half to produce a first result, and mixing the first result with an input right half, wherein calculating the updated right half comprises applying a second function to the input left half to produce a second result, and mixing the second result with a round key, and wherein the input left half and input right half are the initial left half and initial right half for a first of the plurality of rounds, and the updated left half and updated right half for an immediately preceding round for each round thereafter.

\* \* \* \* \*